US011219092B2

(12) United States Patent
Basu Mallick et al.

(10) Patent No.: US 11,219,092 B2
(45) Date of Patent: Jan. 4, 2022

(54) DETERMINING V2X RESOURCES BASED ON INTEREST INDICATIONS FOR V2X COMMUNICATIONS ON MORE THAN ONE RADIO ACCESS TECHNOLOGY

(71) Applicant: Lenovo (Singapore) PTE. LTD., New Tech Park (SG)

(72) Inventors: Prateek Basu Mallick, Dreieich (DE); Joachim Loehr, Wiesbaden (DE); Dimitrios Karampatsis, Ruislip (GB); Genadi Velev, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 138 days.

(21) Appl. No.: 16/593,869

(22) Filed: Oct. 4, 2019

(65) Prior Publication Data
US 2020/0113015 A1  Apr. 9, 2020

Related U.S. Application Data

(60) Provisional application No. 62/742,184, filed on Oct. 5, 2018.

(51) Int. Cl.
*H04W 4/00* (2018.01)
*H04W 88/06* (2009.01)
(Continued)

(52) U.S. Cl.
CPC .............. *H04W 88/06* (2013.01); *H04W 4/40* (2018.02); *H04W 36/14* (2013.01);
(Continued)

(58) Field of Classification Search
CPC .......... H04W 4/40; H04W 4/42; H04W 4/44; H04W 4/46; H04W 4/48; H04W 36/14;
(Continued)

(56) References Cited

U.S. PATENT DOCUMENTS 9,979,790 B1 * 5/2018 Park .................. H04L 69/18
2018/0092112 A1 * 3/2018 Jung .................. H04W 72/10
(Continued)

FOREIGN PATENT DOCUMENTS

WO    2017189035 A1    11/2017
WO    2018022225 A1    2/2018

OTHER PUBLICATIONS

PCT/IB2019/001081, "Notification of Transmittal of the International Search Report and the Written Opinion of the International Searching Authority, or the Declaration", PCT International Searching Authority, dated Jan. 13, 2020, pp. 1-11.
(Continued)

*Primary Examiner* — Matthew W Genack
(74) *Attorney, Agent, or Firm* — Kunzler Bean & Adamson

(57) ABSTRACT

Apparatuses, methods, and systems are disclosed for determining V2X resources based on interest indications for V2X communications on more than one radio access technology. One method includes determining a change in a vehicle-to-everything preference for a vehicle-to-everything application for a remote unit. The method includes transmitting to a network device, a remote unit interest indication in response to determining the change in the vehicle-to-everything preference. The method includes determining vehicle-to-everything resources for the remote unit based on a network vehicle-to-everything support type for the network device selected from a plurality of network vehicle-to-everything support types including at least one network vehicle-to-everything support type that supports simultaneous communications on more than one radio access technology.

24 Claims, 9 Drawing Sheets

(51) Int. Cl.
| | |
|---|---|
| *H04W 76/16* | (2018.01) |
| *H04W 4/40* | (2018.01) |
| *H04W 76/27* | (2018.01) |
| *H04W 36/14* | (2009.01) |
| *H04W 52/02* | (2009.01) |
| *H04W 88/08* | (2009.01) |

(52) U.S. Cl.
CPC ....... *H04W 52/0216* (2013.01); *H04W 76/16* (2018.02); *H04W 76/27* (2018.02); *H04W 88/085* (2013.01)

(58) Field of Classification Search
CPC . H04W 36/16; H04W 52/0216; H04W 76/16; H04W 76/27; H04W 88/085; H04W 88/06
See application file for complete search history.

(56) References Cited

U.S. PATENT DOCUMENTS

| | | | | |
|---|---|---|---|---|
| 2019/0037448 | A1* | 1/2019 | Shan | H04W 60/04 |
| 2019/0150082 | A1* | 5/2019 | Kedalagudde | H04W 4/46 370/329 |
| 2020/0029202 | A1* | 1/2020 | Baghel | H04W 72/14 |
| 2020/0084672 | A1* | 3/2020 | Chen | H04J 13/0062 |

OTHER PUBLICATIONS

3GPP, 3rd Generation Partnership Project; Technical Specification Group Services and System Aspects; Enhancement of 3GPP support for V2X scenarios; Stage 1 (Release 16), Sep. 2018, pp. 1-16.
Qualcomm Incorporated, "Enhancements of NR Uu to control LTE sidelink", 3GPP TSG-RAN WG2 Meeting #103bis R2-1814956, Oct. 8-12, 2018, pp. 1-2.
ETSI, "Intelligent Transport Systems (ITS); Vehicular Communications; Basic Set of Applications; Part 3: Specifications of Decentralized Environmental Notification Basic Service", ETSI TS 102 637-3 V1.1.1, Sep. 2010, pp. 1-46.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018, pp. 1-357.
ETSI, "Intelligent Transport Systems (ITS); Communications Architecture", ETSI EN 302 665 V1.1.1, Sep. 2010, pp. 1-44.
3GPP, "3rd Generation Partnership Project; Technical Specification Group Radio Access Network; Evolved Universal Terrestrial Radio Access (E-UTRA); Multiplexing and channel coding (Release 15)", 3GPP TS 36.212 V15.3.0, Sep. 2018, pp. 1-247.
3GPP, "3rd Generation Partnership Project; Technical Specification Group Radio Access Network; Study on Scenarios and Requirements for Next Generation Access Technologies; (Release 15)", 3GPP TR 38.913 V15.0.0, Jun. 2018, pp. 1-39.
3GPP, "3rd Generation Partnership Project; Technical Specification Group Radio Access Network; NR; NR and NG-RAN Overall Description; Stage 2 (Release 15)", 3GPP TS 38.300 V15.3.0, Sep. 2018, pp. 1-92.
3GPP, 3rd Generation Partnership Project; Technical Specification Group Radio Access Network; NR; Radio Resource Control (RRC) protocol specification (Release 15), 3GPP TS 38.331 V15.3.0, Sep. 2018, pp. 1-445.
3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.
LG Electronics, "Revised SID: Study on NR V2X", 3GPP TSG RAN Meeting #81 RP-182111, Sep. 10-13, 2018, pp. 1-6.
3GPP, "3rd Generation Partnership Project; Technical Specification Group Services and System Aspects; Study on enhancement of 3GPP Support for 5G V2X Services (Release 16)", 3GPP TR 22.886 V16.1.1, Sep. 2018, pp. 1-74.
3GPP, "3rd Generation Partnership Project; Technical Specification Group Services and System Aspects; Study on LTE support for Vehicle to Everything (V2X) services (Release 14)" 3GPP TR 22.885 V14.0.0, Dec. 2015, pp. 1-50.

* cited by examiner

ConfiguredGrantConfig information element 400

```
-- ASN1START
-- TAG-CONFIGUREDGRANTCONFIG-START
ConfiguredGrantConfig ::=           SEQUENCE {
    config_identity                     INTEGER (0..15),
    frequencyHopping                    ENUMERATED {intraSlot, interSlot}
                                            OPTIONAL,   -- Need S,
    cg-DMRS-Configuration               DMRS-UplinkConfig,
    mcs-Table                           ENUMERATED {qam256, qam64LowSE}
                                            OPTIONAL,   -- Need S
    mcs-TableTransformPrecoder          ENUMERATED {qam256, qam64LowSE}
                                            OPTIONAL,   -- Need S
    uci-OnPUSCH                         SetupRelease { CG-UCI-OnPUSCH }
                                            OPTIONAL,   -- Need M
    resourceAllocation                  ENUMERATED { resourceAllocationType0,
                                        resourceAllocationType1, dynamicSwitch },
    rbg-Size                            ENUMERATED {config2}
                                            OPTIONAL,   -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}
                                            OPTIONAL,   -- Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
                                            OPTIONAL,   -- Need R
    periodicity                         ENUMERATED {
                                        sym2, sym7, sym1x14, sym2x14, sym4x14,
                                        sym5x14, sym8x14, sym10x14, sym16x14,
                                        sym20x14,... sym2560x12},
    configuredGrantTimer                  INTEGER (1..64)
                                            OPTIONAL,   -- Need R
    rrc-ConfiguredUplinkGrant           SEQUENCE {
        timeDomainOffset                    INTEGER (0..5119),
        timeDomainAllocation                INTEGER  (0..15),
        frequencyDomainAllocation           BIT STRING (SIZE(18)),
        antennaPort                         INTEGER (0..31),
        dmrs-SeqInitialization              INTEGER (0..1)
                                                OPTIONAL,   -- Need R
        precodingAndNumberOfLayers          INTEGER (0..63),
        srs-ResourceIndicator               INTEGER (0..15)
                                                OPTIONAL,   -- Need R
        mcsAndTBS                           INTEGER (0..31),
        frequencyHoppingOffset              INTEGER (1..
                                                maxNrofPhysicalResourceBlocks-1)
                                                OPTIONAL,   -- Need R
        pathlossReferenceIndex              INTEGER (0..maxNrofPUSCH-
                                                    PathlossReferenceRSs-1),
        ... }                           OPTIONAL,       -- Need R
    ... }

CG-UCI-OnPUSCH ::= CHOICE {
    dynamic                             SEQUENCE (SIZE (1..4)) OF BetaOffsets,
    semiStatic                          BetaOffsets
}
-- TAG-CONFIGUREDGRANTCONFIG-STOP
-- ASN1STOP
```

FIG. 4

```
                    LogicalChannelConfig information element 500
-- ASN1START
-- TAG-LOGICAL-CHANNEL-CONFIG-START LogicalChannelConfig ::=            SEQUENCE {
    config_identity                     INTEGER (0..15),
ul-SpecificParameters               SEQUENCE {
        priority                            INTEGER (1..16),
        prioritisedBitRate                  ENUMERATED {kBps0, kBps8, kBps16, kBps32,
                                                kBps64, kBps128, kBps256, kBps512,
                                                kBps1024, kBps2048, kBps4096, kBps8192,
                                                kBps16384, kBps32768, kBps65536, infinity},
        bucketSizeDuration                  ENUMERATED {ms5, ms10, ms20, ms50, ms100,
                                                ms150, ms300, ms500, ms1000,
                                                spare7, spare6, spare5, spare4,
                                                spare3, spare2, spare1}, allowedServingCells                 SEQUENCE (SIZE (1..maxNrofServingCells-1)) OF
                                                ServCellIndex
                                                OPTIONAL,    -- PDCP-CADuplication
        allowedSCS-List                     SEQUENCE (SIZE (1..maxSCSs)) OF
                                                SubcarrierSpacing
                                                OPTIONAL,    -- Need R
        maxPUSCH-Duration                   ENUMERATED { ms0p02, ms0p04, ms0p0625,
                                                ms0p125, ms0p25, ms0p5, spare2, spare1 }
                                                OPTIONAL,    -- Need R
        configuredGrantType1Allowed         ENUMERATED {true}
                                                OPTIONAL,    -- Need R logicalChannelGroup                 INTEGER (0..maxLCG-ID)
                                                OPTIONAL,    -- Need R
        schedulingRequestID                 SchedulingRequestId
                                                OPTIONAL,    -- Need R
        logicalChannelSR-Mask               BOOLEAN,
        logicalChannelSR-DelayTimerApplied  BOOLEAN,
        ...,
        bitRateQueryProhibitTimer           ENUMERATED { s0, s0dot4, s0dot8, s1dot6, s3, s6,
                                                s12, s30}
                                                    OPTIONAL    -- Need R
    }
    OPTIONAL,    -- Cond UL
    ...
}

-- TAG-LOGICAL-CHANNEL-CONFIG-STOP
-- ASN1STOP
```

FIG. 5

DETERMINING V2X RESOURCES BASED ON INTEREST INDICATIONS FOR V2X COMMUNICATIONS ON MORE THAN ONE RADIO ACCESS TECHNOLOGY

FIELD

The subject matter disclosed herein relates generally to wireless communications and more particularly relates to determining V2X resources based on interest indications for V2X communications on more than one radio access technology (e.g., LTE and NR).

BACKGROUND

The following abbreviations are herewith defined, at least some of which are referred to within the following description: Third Generation Partnership Project ("3GPP"), Fifth Generation Core Network ("5GC"), Fifth Generation System ("5GS"), Authentication, Authorization and Accounting ("AAA"), Access and Mobility Management Function ("AMF"), Positive-Acknowledgment ("ACK"), Application Function ("AF"), Application Programming Interface ("API"), Authentication Center ("AuC"), Access Stratum ("AS"), Base Station ("BS"), Binary Phase Shift Keying ("BPSK"), Bandwidth Part ("BWP"), Broadband Forum ("BBF"), Clear Channel Assessment ("CCA"), Control Element ("CE"), Cooperative Awareness Messages ("CAM"), Cyclic Prefix ("CP"), Cyclical Redundancy Check ("CRC"), Channel State Information ("CSI"), Common Search Space ("CSS"), Connection Mode ("CM") (this is a NAS state in 5GS), Core Network ("CN"), Control Plane ("CP"), Data Radio Bearer ("DRB"), Discrete Fourier Transform Spread ("DFTS"), Downlink Control Information ("DCI"), Decentralized Environmental Notification Messages ("DENM"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Erasable Programmable Read-Only Memory ("EPROM"), Evolved Node-B ("eNB"), Evolved Packet Core ("EPC"), Evolved Packet System ("EPS"), EPS Mobility Management ("EMM") (this is a NAS state in EPS), Evolved UMTS Terrestrial Radio Access ("E-UTRA") European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Internet-of-Things ("IoT"), International Mobile Subscriber Identity ("IMSI"), Licensed Assisted Access ("LAA"), Liquid Crystal Display ("LCD"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Network Function ("NF"), Non-Orthogonal Multiple Access ("NOMA"), Network Slice Selection Assistance Information ("NSSAI"), Network Slice Selection Policy ("NSSP"), Operation and Maintenance System ("OAM"), Organic Light Emitting Diode ("OLED"), Orthogonal Frequency Division Multiplexing ("OFDM"), Packet Data Unit ("PDU") (used in connection with 'PDU Session'), Packet Switched ("PS") (e.g., Packet Switched domain or Packet Switched service), Personal Digital Assistant ("PDA"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Pilot Time Slot ("PTS"), ProSe Per-Packet Priority ("PPPP"), ProSe Per-Packet Reliability ("PPPR"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA") (similar to tacking area list used in LTE and/or EPC), Registration Management ("RM") (refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Road Side Unit ("RSU"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Semi-Persistent Scheduling ("SPS"), Session Management Function ("SMF"), Service Provider ("SP"), Sidelink ("SL"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), User Data Repository ("UDR"), Uplink Control Information ("UCI"), User Entity/Equipment (Mobile Terminal) ("UE"), UE Interest Indication Procedure ("UIIP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), User Plane Function ("UPF"). Visited Public Land Mobile Network ("VPLMN"), and Worldwide Interoperability for Microwave Access ("WiMAX").

Network procedures to provide certain efficient backwards compatibility with earlier releases of V2X and advanced new features on various types of networks and/or network devices that may or may not support more than one radio access technology (e.g., LTE and NR) are unclear.

BRIEF SUMMARY

Apparatuses for performing efficient interworking for vehicle-to-everything communications on more than one radio access technology are disclosed. Methods and systems also perform the functions of the apparatuses. One embodiment of an apparatus includes a processor that determines a change in a vehicle-to-everything preference for a vehicle-to-everything application for a remote unit. In some embodiments, the apparatus includes a transceiver that transmits to a network device, a remote unit interest indication in response to the processor determining the change in the vehicle-to-everything preference. In various embodiments, the processor further determines vehicle-to-everything resources for the remote unit based on a network vehicle-to-everything support type for the network device selected from a plurality of network vehicle-to-everything support types including at least one network vehicle-to-everything support type that supports simultaneous communications on more than one radio access technology.

One method for performing efficient interworking for vehicle-to-everything communications on more than one radio access technology includes determining a change in a vehicle-to-everything preference for a vehicle-to-everything application for a remote unit. In various embodiments, the method includes transmitting to a network device, a remote unit interest indication in response to determining the change in the vehicle-to-everything preference. In certain embodiments, the method further includes determining vehicle-to-everything resources for the remote unit based on a network vehicle-to-everything support type for the network device selected from a plurality of network vehicle-to-everything support types including at least one network vehicle-to-everything support type that supports simultaneous communications on more than one radio access technology.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which:

FIG. 4 is a diagram illustrating one embodiment of an information element used for determining v2x resources based on interest indications for V2X communications on more than one radio access technology;

FIG. 5 is a diagram illustrating another embodiment of an information element used for determining v2x resources based on interest indications for V2X communications on more than one radio access technology;

DETAILED DESCRIPTION

Figure 1:
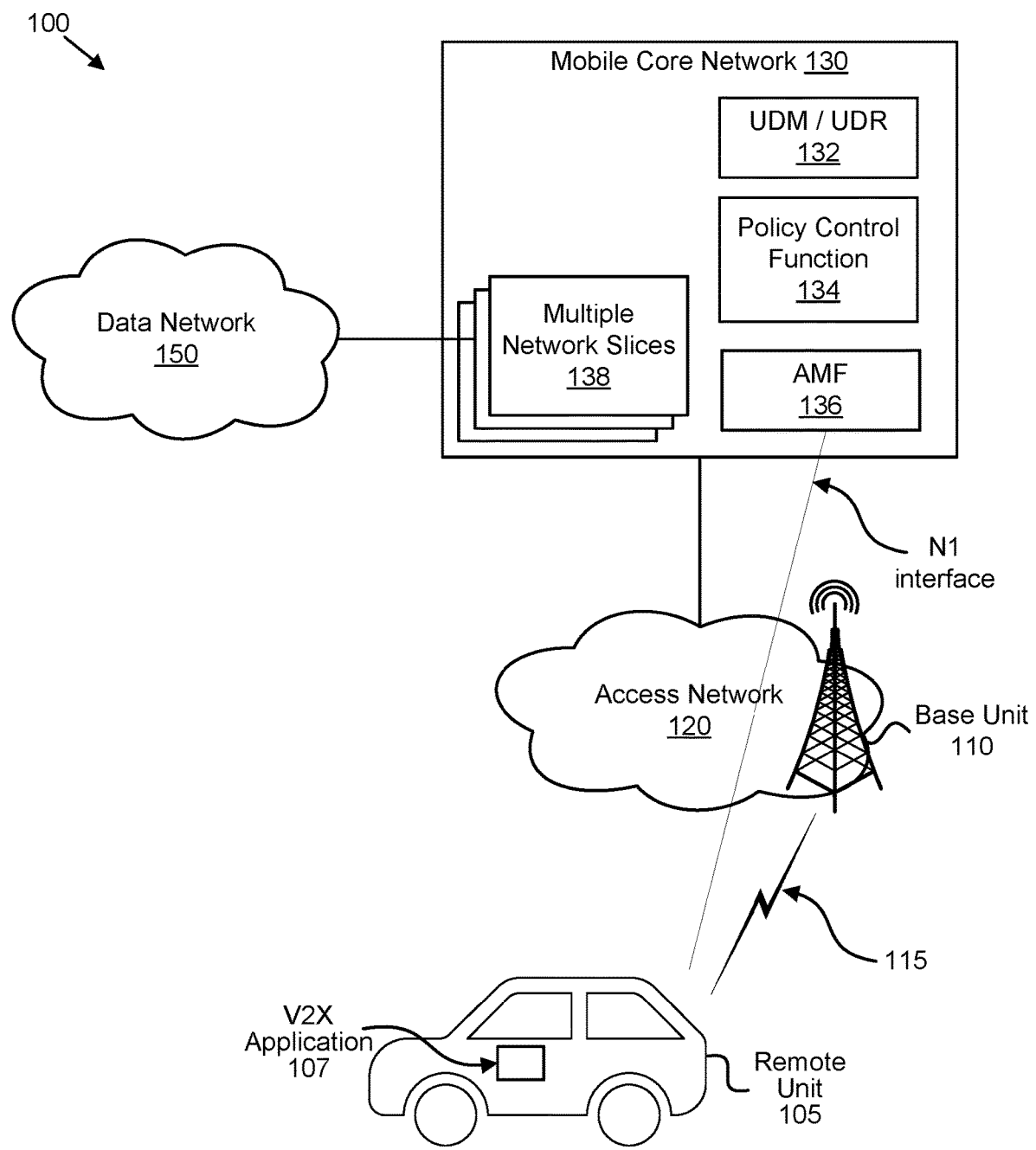
FIG. 1 is a schematic block diagram illustrating one embodiment of a wireless communication system for determining v2x resources based on interest indications for V2X communications on more than one radio access technology.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a RAM, a ROM, an EPROM" or Flash memory, a portable CD-ROM, an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an internet service provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements. The term "and/or" indicates embodiments of one or more of the listed elements, with "A and/or B" indicating embodiments of element A alone, element B alone, or elements A and B taken together.

Generally, the present disclosure describes systems, methods, and apparatus for interworking for V2X communication on multiple radio access technologies. In various embodiments, use cases for advanced V2X services may be categorized into four use case groups: vehicle platooning, extended sensors, advanced driving, and remote driving. A detailed description of each use case group is provided below.

In one embodiment, a basic set of requirements for V2X service is supported which are considered sufficient for basic road safety service. Vehicles (i.e., UEs supporting V2X applications) can exchange their own status information through sidelink, such as position, speed, and heading, with other nearby vehicles, infrastructure nodes and/or pedestrians.

In certain embodiments, new features in V2X sidelink communications are supported, such as for example: carrier aggregation, high order modulation, latency reduction, and feasibility study on both transmission diversity and short TTI in sidelink. In various embodiments, such enhanced features may be based on LTE and may be adapted to co-exists with remote units supported by earlier releases in the same resource pool.

In some embodiments, vehicle platooning enables vehicles to dynamically form a platoon of vehicles traveling together. All the vehicles in the platoon obtain information from the leading vehicle to manage this platoon. This information allows the vehicles to drive closer than normal in a coordinated manner, going in the same direction and traveling together.

In certain embodiments, "extended sensors" enables the exchange of raw or processed data gathered through local sensors or live video images among vehicles, roadside units, devices of pedestrian, and V2X application servers. The vehicles can increase the perception of their environment beyond of what their own sensors can detect and can have a more broad and holistic view of the local situation. A high data rate is one characteristics of an extended sensors use case.

"Advanced driving" enables semi-automated or fully automated driving. Each vehicle and/or RSU shares its own perception data obtained from its local sensors with vehicles in proximity which allows vehicles to synchronize and coordinate their trajectories or maneuvers. Each vehicle shares its driving intentions with vehicles in proximity too.

"Remote driving" enables a remote driver or a V2X application to operate a remote vehicle for those passengers who cannot drive by themselves or to operate remote vehicles located in dangerous environments. For a case where variation is limited and routes are predictable, such as public transportation, driving based on cloud computing can be used. High reliability and low latency are requirements for a remote driving use case.

NR V2X is not intended to replace LTE V2X. Rather, NR V2X is intended to complement LTE V2X for advanced V2X services and support interworking with LTE V2X. From this perspective, a UE supporting NR V2X is also to be capable of LTE V2X so that the basic V2X messages such as BSM can be received from and transmitted to certain UEs e.g., UEs that may not support later advanced V2X communications. For this reason, in various embodiments, the new NR-based V2X UEs (referred to as "eV2X" UEs) are designed to implement both NR and LTE based PC5 protocol stacks so that they can transmit the basic V2X messages that are understandable also to some UEs that may not support various advanced V2X features. In certain embodiments, one RAT, such as for NR, may broadcast SIBs for V2X communication for the other RAT e.g., LTE. However, it is not clear how the actual V2X operations in eV2X UEs can be accomplished on both RATs i.e., how the UEs receive and transmit V2X messages on both NR and LTE RATs to be able to reach the new NR V2X UEs as well as other configurations of UEs.

As described herein, NR V2X Mode-1 refers to a network-assisted scheduling mode when the radio network sends a dynamic or semi-persistent grant for a UE to transmit V2X messages and NR V2X Mode-2 refers to a self-managed scheduling mode in which the network does not send any dynamic or semi-persistent grant but rather the UE itself (e.g., autonomously) chooses the required resources from a resource pool broadcasted by a radio network or from one or more pre-configured resource pools when the UE is out of network coverage to transmit V2X messages. In this sense, NR V2X Mode-2 represents an alternative to 802.11p or DSRC. In certain V2X releases, such modes may have been referred as mode 3 and mode 4 respectively e.g., for V2X communication over LTE.

In certain embodiments, different use cases or applications may use and share the same V2X message. For example, in some embodiments, information included in a DENM can be used by multiple applications such as emergency electronic brake lights, wrong way driving warning and so on. Thus, there is no need for each V2X application to separately generate V2X messages. According to certain embodiments, the V2X application layer is separated from the V2X facilities layer. V2X applications do not have V2X message handling capabilities as this is left to V2X facilities layer. Because the V2X facilities layer serves all V2X applications, the V2X facilities layer can optimize V2X message handling by considering the overall requirements of different V2X applications."

Accordingly, the upper layers, such as V2X Facilities layer, that are sometimes referred to as being above the access stratum may determine in which RAT a V2X message containing packets from one or more applications is to be transmitted. For example, in various embodiments, BSM may be transmitted on LTE (using a vehicle-to-network interface Uu or a direct communications interface PC5) and advance messages with stricter requirements may only be transmitted on NR (using the Uu interface or the PC5 interface). The present disclosure describes a V2X interest indication procedure (also sometimes referred to herein as a UIIP) and certain applications of the UIIP in various scenarios. Note that in various embodiments, these scenarios may depend on the UE's RRC state and on network V2X support provided.

In certain embodiments, a UE's RRC state plays a role in deciding how the actual transmission and/or reception will be accomplished for V2X communication. A UE can be in an idle state (e.g., RRC idle), a connected state (e.g., RRC connected), an inactive state (e.g., RRC inactive) and/or an out-of-coverage state (e.g., the UE is out-of-coverage of any base station on any supported radio access technology). With regard to V2X communications, in this disclosure, an inactive state (e.g., RRC Inactive or RRC suspended state) is treated same as an idle state (e.g., RRC Idle state) in that the UE uses the broadcast information of the current serving cell. Therefore, the UE behaviors described below may also apply to a UE in an idle state (e.g., RRC Inactive state) for each of the described methods.

In some embodiments, network V2X support varies and the following support types are described: 1) network V2X support type-1: means that the network device (e.g., the serving cell or base station) does not support V2X i.e., provides no resources for V2X communication; 2) network V2X support type-2: means that the network device supports V2X for only a particular RAT i.e., provides resources for V2X communication only on that RAT (e.g., a gNB providing resources for NR-based V2X communication or an eNB providing resources for LTE-based V2X communication); and 3) network V2X support type-3 means that the network supports V2X for multiple RATs i.e., provides resources for V2X communication for at least 2 RATs (e.g., a gNB or an eNB providing resources for NR based V2X communication as well as for LTE based V2X communication).

FIG. 1 depicts an embodiment of a wireless communication system 100 for interworking for V2X communication on multiple radio access technologies such as LTE and NR, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art may recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, PDAs, tablet computers, smartphones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smartwatches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via UL and DL communication signals. Furthermore, the UL and DL communication signals may be carried over the communication links 115.

In some embodiments, the remote unit 105 determines a change in a vehicle-to-everything preference for a vehicle-to-everything application, transmits to a network device such as base unit 110 a remote unit interest indication in response to determining the change in the vehicle-to-everything preference, and determines vehicle-to-everything resources for the remote unit based on a network vehicle-to-everything support type for the network device selected from several network vehicle-to-everything support types including at least one network vehicle-to-everything support type that supports simultaneous communications on more than one radio access technology. A remote unit 105 may be capable of performing V2X communication in both NR and LTE. Note that legacy UEs in the wireless communication system (not shown) may be only capable of LTE V2X. In various embodiments, the remote units 105 may be capable of sidelink or short-range communications with other remote units 105 in the wireless communication system. Each remote unit 105 includes at least one V2X application 107 for V2X communications.

In some embodiments, a remote unit 105 may establish a data connection (e.g., a PDU session) with the data network 150 via the mobile core network 130. Here, the data path of a PDU session may be established over one of the multiple network slices 143 supported by the mobile core network 130. The specific network slice 138 used by the PDU session may be determined by the S-NSSAI attribute of the PDU session. Here, the remote unit 105 may be provisioned with NSSP rules which it uses to determine how to route a requested PDU session.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a RAN, that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and the mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 115. The communication links 115 may be any suitable carrier in a licensed or an unlicensed radio spectrum. The communication links 115 facilitate communication between one or more of the remote units 105 and/or one or more of the base units 110.

In one embodiment, the mobile core network 130 is a 5GC, which may be coupled to a data network 150, like the Internet and private data networks, among other data networks. In some embodiments, the remote units 105 communicate with an AF 155 (external to the mobile core network 13) via a network connection with the mobile core network 130. Each mobile core network 130 belongs to a PLMN. The present disclosure is not intended to be limited to the implementation of any particular wireless communication system architecture or protocol. For example, other embodiments of the mobile core network 130 include an EPC or a multi-service core as described by the BBF.

The mobile core network 130, in various embodiments, includes several network NFs and multiple network slices 143. As depicted, the mobile core network 130 includes at least one unified data management with an internal user data repository, such as UDM/UDR 132, at least one PCF 134, and at least one AMF 136. Although a specific number of NFs are depicted in FIG. 1, one of skill in the art will recognize that any number of NFs may be included in the mobile core network 130. In certain embodiments, each of the multiple network slices 143 includes its own dedicated network functions (not shown), such as an SMF and a UPF. While the depicted embodiment shows a single AMF 136 in the mobile core network 130, in other embodiments each of the multiple network slices 143 may implement its own AMF 136.

In one embodiment, the UDM/UDR 132 includes a UDM and its internal component a UDR. In some embodiments, the UDR holds subscription data including policy data. Specifically, the policy data stored by the UDM/UDR 132 includes the NSSP. In various embodiments, the UDM/UDR 132, PCF 134, AMF 136, and SMF (not shown) are examples of control plane network functions of the mobile core network 130. Control plane network functions provide services such as UE registration, UE connection management, UE mobility management, session management, and the like. In contrast, a UPF provides data transport services to the remote units 105.

In certain embodiments, the multiple network slices 143 are logical networks within the mobile core network 130. The network slices 143 are partitions of resources and/or services of the mobile core network 130. Different network slices 143 may be used to meet different service needs (e.g., latency, reliability, and capacity). Examples of different types of network slices 143 include eMBB, mMTC, and URLLC. A mobile core network 130 may, in some embodiments, include multiple network slice instances of the same network slice type. Different network slice instances of the same type may be distinguished by a slice "tenant" (also known as a "slice differentiator") associated with the instance.

In some embodiments, the wireless communication system 100 explicitly indicates network support of V2X communication on a particular RAT using a Boolean flag in one or more of: a broadcast message, dedicated RRC signaling or in a NAS message (e.g., during NAS Registration) for each RAT. In other embodiments, SIB Types or SIB numbers (for example, SIB-30 for LTE V2X support and SIB-31 for NR V2X support) may be specified such that the said SIB Type(s) will signal necessary information to the UEs to accomplish V2X communication for a corresponding RAT.

In such embodiments, network support of V2X communication on a particular RAT may be implicitly indicated by the presence of scheduling information (e.g., as part of SIB1 content) irrespective of whether the corresponding SIB is actually in transmission. As an example, if scheduling information for SIB-30 is present (e.g., as part of SIB1 content), then the remote unit 105 assumes that the current radio network/cell supports LTE V2X support irrespective of if SIB-30 is being transmitted. In an alternative embodiment, a remote unit 105 determines network support of V2X communication on a particular RAT based on the successful acquisition of the corresponding SIB and not based solely on the SIB scheduling information.

Figure 2:
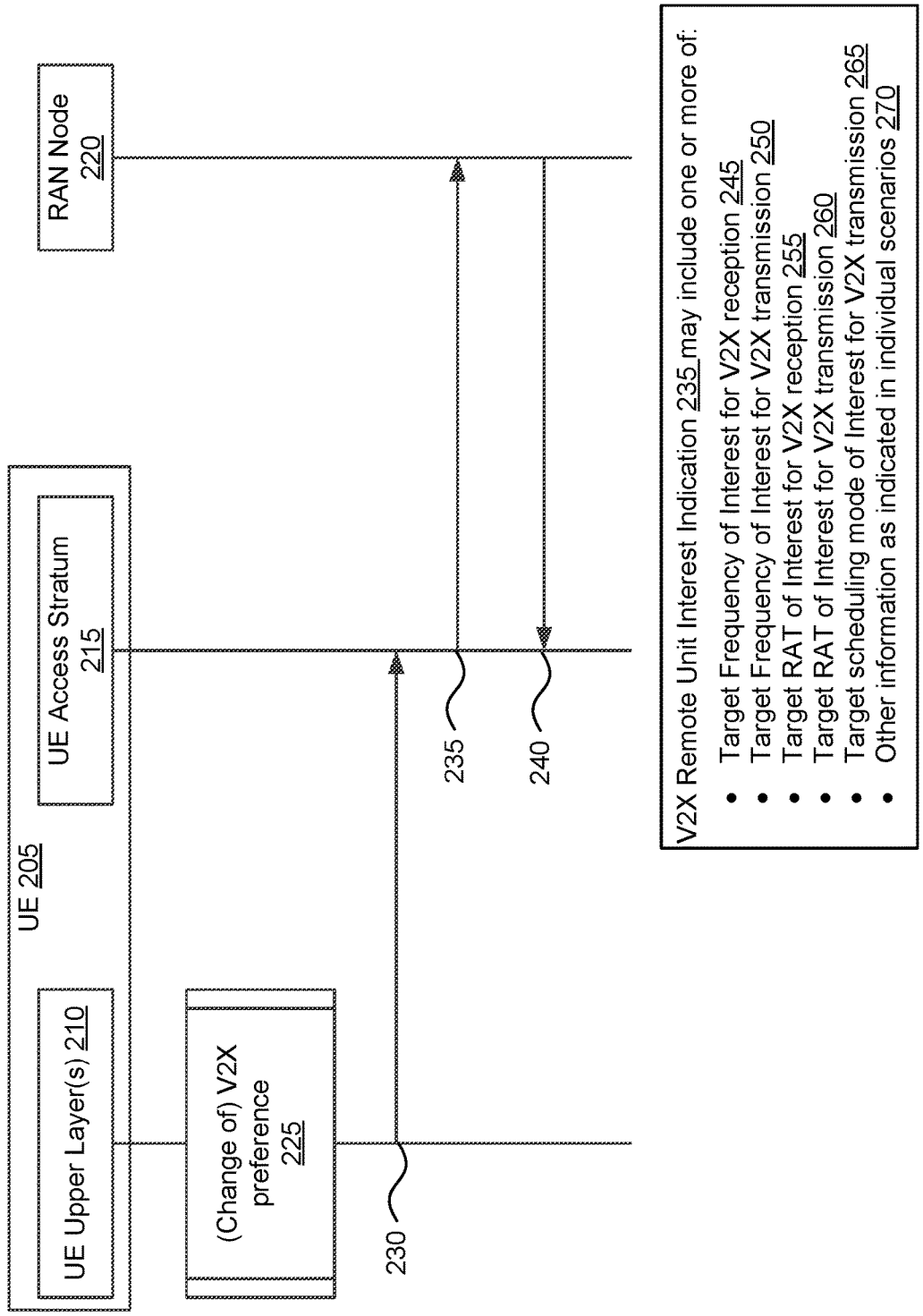
FIG. 2 is a diagram illustrating a network procedure for determining v2x resources based on interest indications for V2X communications on more than one radio access technology.

FIG. 2 depicts a network procedure 200 for interworking for V2X communication on multiple radio access technologies, according to various embodiments of the disclosure. In one embodiment, the network procedure 200 may be a first embodiment of a "UE interest indication" procedure and may be implemented using the wireless communication system 100. The network procedure 200 depicts a UE 205 (having UE upper layers 210 and UE access stratum layers 215). In the embodiment, the UE 205 is in communication with a RAN node 220. The UE 205 may be one embodiment of the remote unit 105 and the RAN node 220 may be one embodiment of the base unit 110 also sometimes referred to as a network device. Within the UE 205, the UE upper layers 210 may determine to which RAT a V2X message is to be sent.

As a first step of this procedure, when one or more currently running applications are terminated, the UE upper layers 210 evaluate whether one or more new applications can be better served on a different frequency and/or RAT and/or scheduling mode and/or if the remaining applications can be better served on a different frequency and/or a different RAT and/or using a different scheduling mode. In certain embodiments, the UE upper layers may have support from the UE Access Stratum 215 to make this evaluation. The UE upper layers 210 may include one or more of: the application layer, the V2X client, the V2X facility layer, and/or the NAS layer. In various embodiments, one or more of these layers are configured to know the preference of each application on its own or together with other applications so that a collective decision may be made by the UE upper layers 210 and a V2X preference or a change of V2X preference 225 may be determined for the UE 205.

In various embodiments, as a next step, the UE upper layers 210 may transmit the V2X preference 225 to the UE Access Stratum 215. In certain embodiments, the V2X preference 225 may include a target frequency, a target RAT, and/or a target scheduling mode. In some embodiments, the UE Access Stratum 215 initiates a cell reselection if the UE 205 is in RRC Idle state or the UE Access Stratum 215 may transmit a "V2X interest indication" 225 to the radio network, accordingly. As one example, a BSM may prefer (e.g., indicate an interest) in a first RAT, e.g., an LTE-based V2X communication while some advanced V2X applications may prefer (e.g., indicate an interest in) a second RAT (e.g., NR-based V2X communication).

In various embodiments, the remote unit interest indication 235 for V2X communications (also sometimes referred to as a UE interest indication, or a V2X interest indication) may include one or more of: a target frequency of interest for V2X reception 245, a target frequency of interest for V2X transmission 250, a target RAT of interest for V2X reception 255, a target RAT of interest for V2X transmission 260, a target scheduling mode of interest for V2X transmission 265, or some other information 270 as indicated in various individual scenarios.

In some embodiments, the remote unit interest indication 235 includes a target scheduling mode 265 such as a network-assisted scheduling mode wherein the network device sends a grant for the remote unit to transmit vehicle-to-everything messages or a self-managed scheduling mode wherein the remote unit selects resources for transmitting vehicle-to-everything messages from a resource pool broadcasted by the network device such as the RAN node 220, a resource pool for the remote unit such as the UE 205 when it is out of network coverage In certain embodiments, a network vehicle-to-everything support type for a network device such as RAN node 220 may be a first support type that provides no resources for vehicle-to-everything communication. In other embodiments, the network vehicle support type for the RAN node 220 is a second support type that provides vehicle-to-everything resources for a single radio access technology. In various embodiments, the network vehicle-to-everything support type is a third support type that provides vehicle-to-everything resources for more than one radio access technology (e.g., LTE V2X and NR V2X). In some embodiments, the UE 205 determines the network vehicle-to-everything support type for each radio access technology supported by the RAN node 220 as communicated directly in a communication such as for example, a broadcast message, dedicated radio resource control signaling, a non-access stratum message, and/or combinations thereof.

If the UE capability or network support does not allow for doing both current and target V2X communication (based on the change of V2X preference 225) simultaneously, then in various embodiments, the UE 205 chooses one V2X communication type over the other. To this end, a priority (such as a PPPP, QoS class, etc.) of competing applications may be taken into account by the UE upper layers 210 and the behavior of the UE 205 (e.g., cell reselection in an RRC idle state or transmission of V2X interest indication in RRC connected state) is affected in various embodiments by the higher prioritized application.

For example, for a UE 205 that is in RRC connected mode, in some implementations, one or more non-V2X applications may have higher priority than the V2X applications and in response, the UE 205 may not further react to the change of V2X preference 225 at the moment (e.g., where the higher priority non-V2X application does not require cell reselection).

Further, some UEs 205 may support both V2X and non-V2X applications, while others may support only V2X applications. Moreover, in some embodiments, a remote unit such as the UE 205, in response to determining that the remote unit is in a radio resource control connected state, selects the vehicle-to-everything preference 225 for the vehicle-to-everything application responsive to determining that the vehicle-to-everything application has a priority indicator with a higher priority than a non-vehicle-to-everything application. In certain embodiments, in response to that UE 205 determining that simultaneous current and target vehicle-to-everything communications are not allowed based on at least one of a vehicle-to-everything capability of the remote unit and the network vehicle-to-everything support type of the RAN node 220, selects the vehicle-to-everything preference 225 for the vehicle-to-everything application responsive to determining that a priority indicator of the vehicle-to-everything application is higher than corresponding priority indicators of at least one competing vehicle-to-everything application.

In one embodiment, the cell, RAT, and/or PLMN selection, of these different types of UEs 205 may depend on their subscription information as well as on the currently running V2X application (e.g., if the RAN node 220 provides the Mode-2 resources for the UE 205 to carry out V2X communication in the RRC idle mode). Therefore, in one embodiment, the cell/network selection depends on the change of V2X preference 225 (which is communicated in the remote unit interest indication 235) of the triggering or running V2X application as determined in the UE upper layers 210, as described above.

In one embodiment, a UE 205 camped on a certain cell and using Mode-2 (self-managed scheduling) resources may reselect to another cell of the same or of a different RAT in response to a change in a running V2X application such that a different or new application may be better served, e.g., by fulfilling targeted QOS requirements, connecting on a target frequency and/or RAT and/or using a different scheduling mode. For example, a change of scheduling mode may indicate that Mode-2 based V2X transmissions and/or reception are not good enough for the different/new application and the UE 205 should change to Mode-1 to get semi-persistent resources. Or the change in scheduling mode may indicate the reverse i.e., that the requested V2X communications do not require high-priority services and therefore, the UEs 205 should change to mode to so as to free up resources for higher priority applications that would benefit from mode one V2X communications.

Similarly, a target RAT of interest 255, 260 may be fulfilled by reselecting to a cell belonging to the target RAT. This is interest-based reselection is different from a service-based reselection and such interest-based reselections are, in principle, still intra-service. In other words, such reselections are not triggered by the start/stop of V2X communications, but rather by the start/stop of different V2X applications.

In one embodiment, a behavior similar to that of a UE in an RRC Idle state is implemented for a UE in an RRC Connected state. Here, the UE upper layers 210 first determine the V2X preference, or change of V2X preference 225, and indicate the same to the UE Access Stratum layer 215. Subsequently, a renewed or updated V2X remote unit interest indication 235 may be sent from the UE AS layer 215 to the RAN node 220 to indicate that the UE 205 now prefers a different target frequency of interest 245, 250, target RAT 255, 260, and/or target scheduling Mode-265. In various embodiments, the RAN node 220 sends a V2X Response 240 to the UE 205. The V2X Response 240 may be different for each scenario. For example, in certain embodiments, the RAN node 220 may take one or more of the following actions: 1) configuring measurements such as intra-frequency, inter-frequency, or RAT measurements to the UE; and/or 2) (subsequently) performing a handover of the UE 205 accordingly to another target RAN node 220b or 3) merely changing to the target scheduling Mode-265 (e.g., Mode-1 changing to Mode-2 or vice versa) by signaling appropriate resource pool(s) for transmission/reception if that was the target preference (e.g., as indicated in the remote unit interest indication 235) from the UE 205, or 4) providing resources for the target RAT 255, 260 and/or target scheduling Mode-265 if the RAN node 220 (e.g., the serving cell) supports the resources for the target RAT 255,260, the target scheduling mode 265, etc.

Referring now to FIGS. 3-7, the following scenarios are described in certain embodiments exemplifying the application of a remote unit interest indication procedure which is also referred to herein as a UIIP. In some embodiments of the depicted scenarios, the application of the UIIP may be partial. For example, in some embodiments, if the UE 205 is in an RRC idle state, it may determine a V2X preference or a change of V2X preference 225 in the UE 205 but may not immediately communicate this to the RAN node 220. In other embodiments, the application of the UIIP may include signaling the determined V2X preference 225 to the access network 120 by transmitting the remote unit interest indication 235 to the RAN node 220, whereby in response, the RAN node 220 transmits a V2X response to the UE 205 which execute the network's V2X response accordingly.

Figure 3:
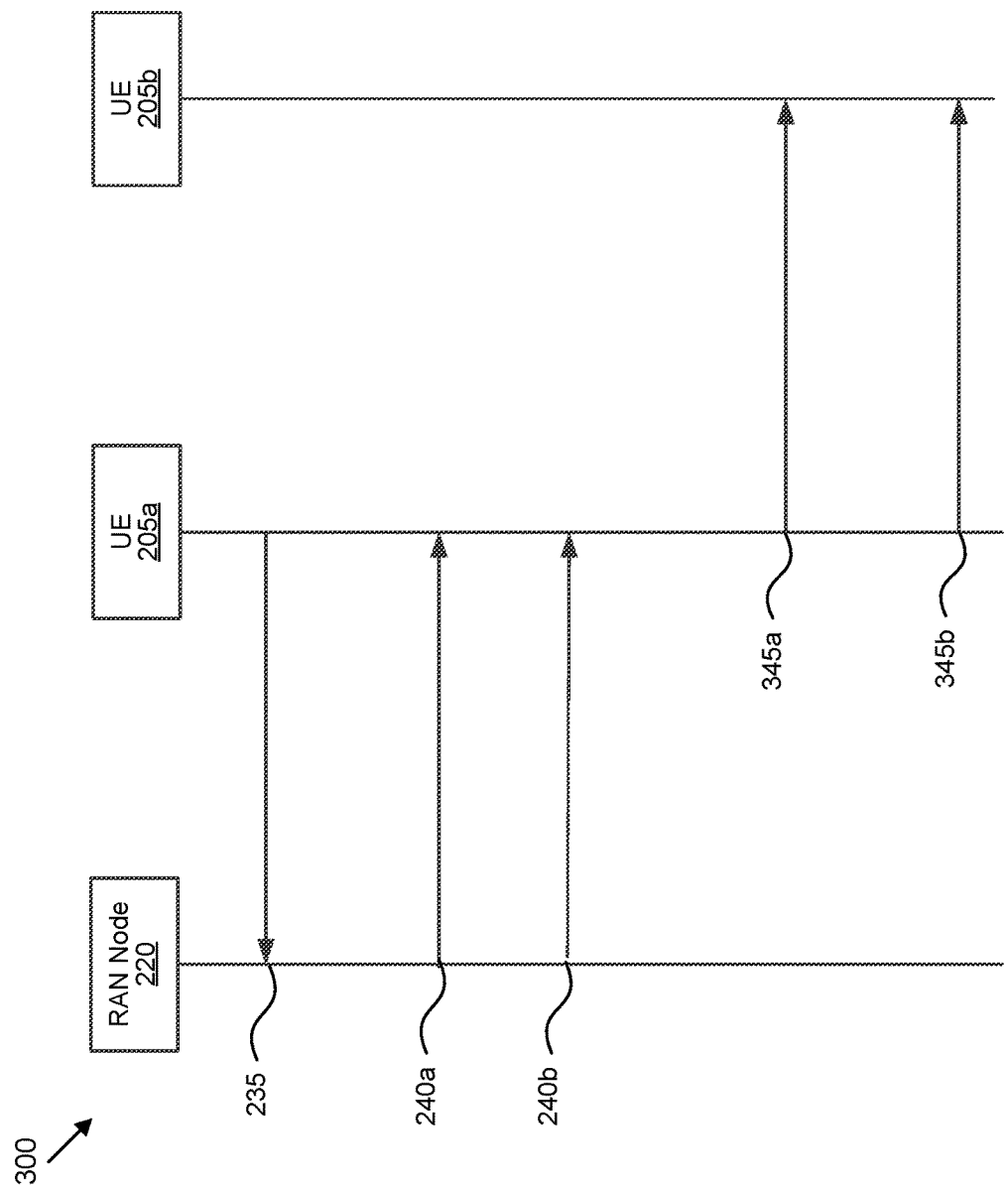
FIG. 3 is a diagram illustrating one embodiment of a network procedure for determining v2x resources based on interest indications for V2X communications on more than one radio access technology.

FIG. 3 is a diagram illustrating one embodiment of a network procedure 300 for efficient interworking for V2X communication on more than one radio access technology. In one embodiment (referred to herein as Scenario1), the network procedure 300 involves a RAN node 220 that communicates with a first UE 205a and a second UE 205b to provide Mode-1 scheduling (e.g., network-assisted scheduling) of V2X resources for data transmission from UE 205a to UEs 205b. The RAN node 220 (also sometimes referred to herein as a network device) is in one embodiment, a serving cell configured to provide resources for V2X sidelink operations on more than one RAT (e.g., LTE and NR).

In one embodiment, the network procedure 300 includes a remote unit interest indication 235 from the UE 205a to the RAN node 220 similar to the remote unit interest indication 235 described above with respect to FIG. 2. In certain embodiments, the UE 205a receives control information such as for example sidelink control information (SCI format 0/1 in LTE) which is used to indicate available resources (e.g., including on difference RATs such as LTE and NR) for V2X sidelink transmissions 345a, 345b from UE 205a to UE 205b (for decoding by UE 205b). In such embodiments, downlink control information format (i.e., DCI formation 5A in LTE) is transmitted from the RAN node 220 to the UE 205a for scheduling a sidelink transmission 345a, 345b from UE 205a to other UEs such as UE 205b. In other words, the RAN node 220 grants resources to the UE 205a for the sidelink transmissions 345a, 345a.

In one embodiment, the UE 205 may be an RRC-connected UE and the RAN node 220 may be a serving cell that exhibits network behavior for network V2X support type-3 which supports V2X communications on more than one RAT as described above. In some embodiments, cross-RAT dynamic and SPS scheduling are performed by the network procedure 300.

In one embodiment, the network procedure 300 performs dynamic scheduling of V2X resources on more than one RAT (e.g., LTE and NR). The network procedure 300, in some embodiments, includes a remote unit interest indication 235 for V2X communications based on the UE 205*a* determining a change in V2X preference as described above with respect to FIG. 2.

In certain embodiments, the UE 205 performs dynamic scheduling of network-assisted mode resources for the vehicle-to-everything application on a first radio access technology sidelink and on a second radio access technology sidelink, using network-assisted mode resources of the first radio access technology sidelink and the second radio access technology sidelink indicated in control link information received from a network device such as the RAN node 220, where the control link information may include downlink control information and/or broadcast information, etc. In various embodiments, the control link information directly indicates for which of the first radio access technology sidelink and the second radio access technology sidelink a grant is being provided.

In some embodiments, the Mode-1 resources of a network that supports RAT1 V2X sidelink communication are dynamically signaled by the radio network through that RAN node 220 using DCI format 5A if the RAT1 is LTE and/or the Mode-1 resources of RAT2 V2X sidelink communication are dynamically signaled by the radio network using a similar content DCI format for NR V2X sidelink if RAT2 is NR. The RAN node 220 (e.g., radio network and/or cell) may in various embodiments, be either an LTE eNB or an NR gNB. In one embodiment, PDCCH transmissions (using DCI format 5A or like) for indicating LTE and NR grants are made on different search spaces, CORESETs, numerologies, and/or bandwidth part configurations. A receiving UE such as the UE 205*b* can know based one or more of these segregations if the grant is for LTE or NR based V2X sidelink communications.

In one alternative, DCI transmitted in a message 240*a*, 240*b* may be scrambled with different RNTIs such as for example a first RNTI for specific V2X applications like BSM applications for LTE based dynamic allocations and second RNTI for advanced V2X application such as for NR based dynamic allocations. Similarly, in one enhancement, the message 240*a*, 240*b* may include control information SCI that is scrambled with different RNTIs. For example, the SCI may be scrambled with a first RNTI for specific V2X applications like BSM applications and with a second RNTI for advanced V2X applications. In an alternative embodiment, instead of the DCI and/or SCI being scrambled with different RNTIs, various V2X parameters such as a bearer, an application type, a source id, or a destination id, or a part of such V2X parameters can be indicated explicitly in the DCI or SCI format addressing V2X communication. In this alternative embodiment, Common DCI or SCI format may be used and may indicate whether the scheduling is for NR V2X sidelink or for LTE V2X sidelink either explicitly or implicitly. In certain embodiments, the identification for a particular bearer and/or application type and/or source or destination uniquely indicates for which RAT (e.g., LTE or NR) the V2X sidelink grant is being provided. In various embodiments, the resources for either or both RATs may be signaled as well in the DCI format.

In an alternative embodiment, the network procedure 300 may include SPS. In such an embodiment, the UE 205 may receive one or more messages 240*a*, 240*b* allocating semi-persistent resources on one or both RATs for V2X sidelink communication and as an enhancement of such an embodiment, the resources can be tied to a particular QoS class/application/bearer/source or destination ID. To achieve this, RRC signaling from the radio network through the RAN node 220 may first configure the SPS configuration(s) for one or both RATs and then L1 signaling e.g., via messages 240*a*, 240*b* (using the DCI format) may provide exact time and/or frequency resources and may activate them.

FIG. 4 depicts one embodiment of a ConfiguredGrant-Config information element 400 according to embodiments of the disclosure. In some embodiments, for NR a ConfiguredGrantConfig may be configured to the UE 205 and similarly for LTE, an SPS configuration for V2X resources for use by the UE 205 may be signaled.

FIG. 5 depicts one embodiment of aLogicalChannelConfig information element 500, according to embodiments of the disclosure. In various embodiments, the linking between particular service (QoS/application/bearer/source or destination ID) links a logical channel (LogicalChannelConfig) to the SPS configuration (config identity) using RRC signaling.

Referring again to FIG. 3, various embodiments of the network procedure 300 may include a Mode-2 sub-embodiment in which a radio network may provide a resource pool (indicated in a broadcast message or in a dedicated message) for Mode-2 V2X communication. The Mode-2 resources for V2X sidelink operation either, or both RATs, are broadcasted or sent to the UE 205 in dedicated RRC signaling when the UE 205 transmits its V2X interest indication in making sidelink communications 345*a*, 345*b* such as PC5 communications in either, or both, RATs.

Based on the V2X preference indication from the UE upper layers 210, a UE 205 in an RRC idle state may start using (receiving and transmitting V2X communication messages) the resource pool(s) for either or both RATs if the same is broadcasted by the serving cell. A network may, however, choose to not broadcast the V2X resource pool(s) for either, or both, RATs even when it supports V2X communication (the related SIBs for either/both RATs are scheduled in the scheduling information present in SIB1) and in this case the RRC idle state UE may first establish an RRC connection.

In various embodiments, the remote unit interest indication 235 includes at least one target radio access technology of interest, and self-managed mode resource pool information to use for vehicle-to-everything communications on the at least one target radio access technology of interest. In such embodiments, the UE 205 receives a self-managed mode resource grant from a network device such as the RAN node 220, based on the self-managed mode resource pool information. Thus, in some embodiments, the UE 205 indicates its interest in making PC5 communication such as sidelink communications 345*a*, 345*b* in one or more RATs to a serving cell such as RAN node 220 using RRC dedicated message as explained earlier (V2X interest indication) and can also indicate the resource pool information that it intends to use as Mode-2 resources in either or both RATs. The RAN node 220*a* may take the remote unit interest indication 235 for its scheduling decisions. In certain embodiments, the remote unit interest indication 235 includes one or more vehicle-to-everything identification interests such as application identifications, quality of service identifications, destination identifications, source identifications, etc.

In some embodiments, the UE 205*a* may send a request for resources as part of the V2X interest indication to the radio network also including one or more of the following: V2X application IDs, QoS ID, source ID, and/or destination ID; V2X message Types such as for example, CAM, DENM, and/or BSM. In certain embodiments, the remote unit interest indication 235 further includes other information as indicated in individual V2X scenarios 270 such as vehicle platooning, advanced driving, extended sensors, remote driving, as explained above.

In various embodiments, the RAN node 220 upon receiving the request from the UE 205a may decide whether the resources need to be provided to the UE for V2X communication for one or both RATs and also if the resources will be scheduled in Mode-1 or Mode-2. It will accordingly respond to the UE (V2X Response). For example, the V2X response 240 may indicate that the resources will be provided using dynamic or semi-persistent scheduling towards one or both RATs for Mode-1 transmissions and resource pool for receptions. To this end the DCI formats serve as the V2X Response and may be directly used for dynamic scheduling and/or for SPS scheduling where RRC signaling may be used to indicate the SPS resources directly with the resource pools for one or both RATs for Mode-2 transmissions and receptions as part of one or more messages 240a, 240b such as a V2X response for one or both RATs.

In some embodiments, one or more messages 240a, 240b may indicate that the resources from broadcast may be used for which of the one or both RATs for Mode-2 transmissions and receptions; the UE shall accordingly acquire the resource pool information from the corresponding SIBs. SIB type/number broadcasting resources for V2X sidelink communication on each RAT can be specified. In certain embodiments, one or more of the messages 240a, 240b may indicate a possible combination such that Mode-1 is used for RAT1 V2X sidelink operation and Mode-2 is used for RAT2 V2X sidelink operation with appropriate resource pools. In further embodiments, one or more of the messages 240a, 240b may indicate that no (change of) V2X sidelink operation can be performed at the moment if source V2X/non-V2X applications are of higher priority.

Figure 6:
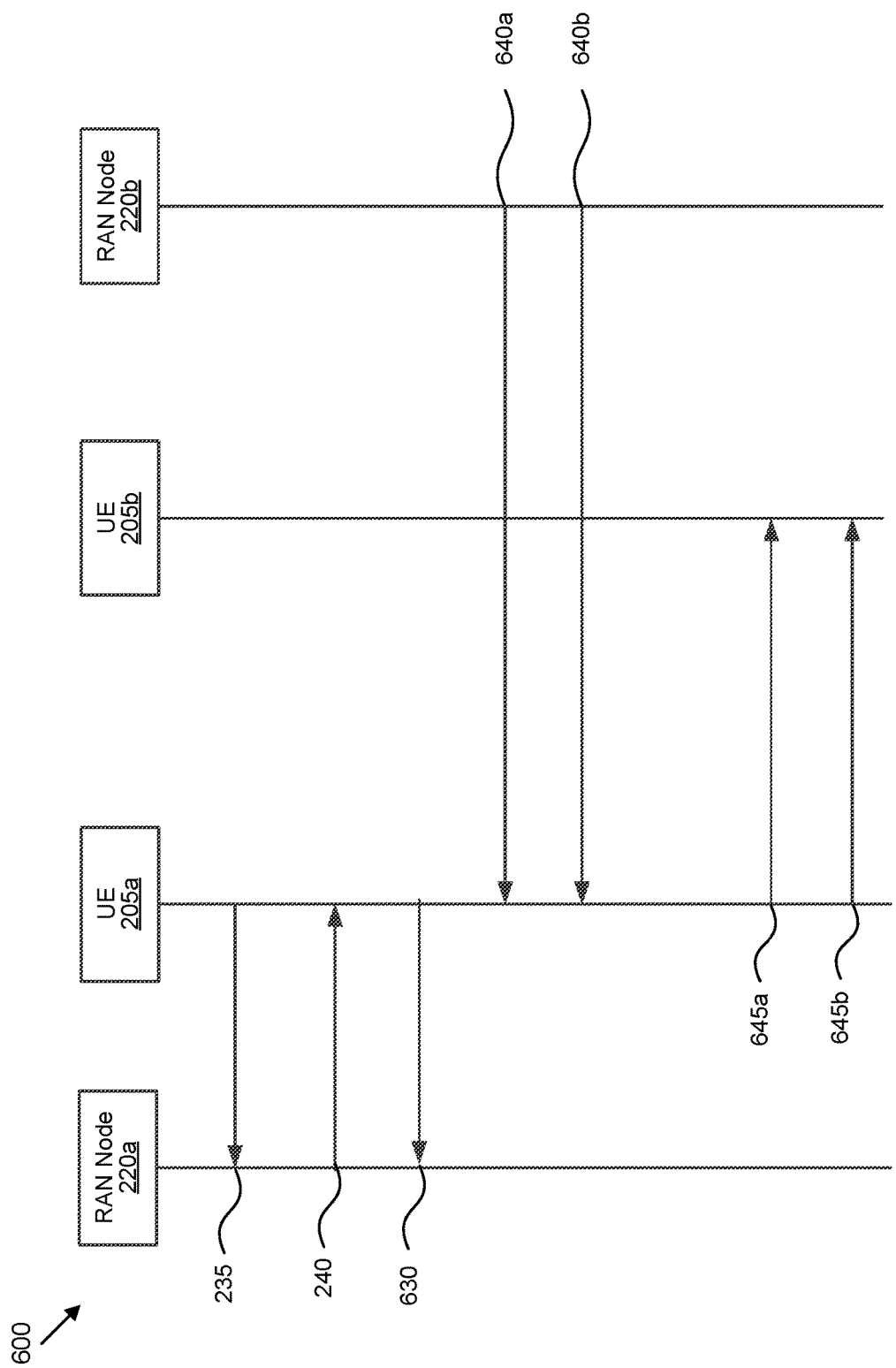
FIG. 6 is a diagram illustrating one embodiment of a network procedure for determining v2x resources based on interest indications for V2X communications on more than one radio access technology involving a serving cell providing V2X resources for one radio access technology.

FIG. 6 is a diagram illustrating one embodiment of a network procedure 600 for efficient interworking for V2X communication involving a serving cell such as the RAN node 220a providing V2X resources for one radio access technology only. One such scenario is referred to herein as Scenario-2 and describes circumstances in which a serving cell such as the RAN node 220a provides resources for RAT1 only. In various embodiments, RRC signaling (e.g., broadcast and/or dedicated) from the RAN node 220a indicates for which RATs it supports V2X sidelink operations such as the communication 745a or 745b. In some embodiments, this can be achieved by the presence of scheduling information of a corresponding SIB Type specified to carry information necessary to accomplish V2X sidelink operation on each RAT. A UE V2X interest indication 235 and a V2X Response 240 from a network device such as the RAN node 220 may be performed similarly as in the first scenario described above for an RRC connected UE.

In various embodiments, in response to receiving the V2X response 240 that indicates that the RAN node 220a supports only one RAT other than a target RAT of interest, the UE 205a may send one or more messages 630 to the RAN node 220a to facilitate accessing the target RAT of interest on a second network device such as RAN node 220b or to facilitate accessing self-managed Mode-2 resources to perform V2X communication 645a, 645b on the target RAT(s) of interest.

In one embodiment, if the UE 205a determines a change of V2X preference 225 e.g., that the V2X application (e.g., via the V2X facilities layer) messages need to be transmitted on/received from a particular RAT (say RAT2, as decided by higher layers) that is not supported for V2X sidelink operation by the current serving cell, then the UE 205a enables a V2X sidelink operation to be performed on RAT2 for which the V2X sidelink operation is not supported in a serving cell such as the RAN node 220a. This can be done using a variety of methods and/or embodiments described herein.

In one embodiment, UE 205a initiates the network procedure 600 using the remote unit interest indication 235 (also referred to herein as a UIIP by transmitting the V2X remote unit interest indication to the network device such as the RAN node 220a. A V2X response from the RAN node 220a may be a measurement configuration towards the target preferred frequency or RAT indicated by the UE 205a in the V2X interest indication. A V2X response, in certain embodiments, may be a handover command towards the target preferred frequency or RAT indicated by the UE in the V2X interest indication. Thus, in response to the network device determining that the change in the vehicle-to-everything preference for the vehicle-to-everything application is to communicate a vehicle-to-everything message on a radio access technology that is not supported on the network device, the processor receives a vehicle-to-everything response including a handover command toward a target frequency interest indicated in the remote unit interest indication and/or a target radio access technology indicated in the remote unit interest indication.

In certain embodiments, in response to determining that the UE 205a is served by the RAN node 220a that support only a first radio access technology, and is within coverage of a second network device such as RAN node 220b using a second radio access technology belonging to an allowed public land mobile network and that cell selection criteria based on reference signal received power for the remote unit are satisfied for the second network device, the UE 205a uses self-managed scheduling mode resources from a broadcast resource pool from the second network device i.e., the RAN node 220b for vehicle-to-everything sidelink communications. Hence, if the UE is in coverage of a cell from RAT2 belonging to allowed (e.g., home, registered, equivalent, etc.) PLMN and the cell selection S-criteria is met, the UE may use the mode-2 resources if the said cell from RAT2 broadcasts resource pool for PC5 operation (transmission and/or reception).

In various embodiments, in response to determining that a remote unit such as the UE 205a is served by a network device such as RAN node 220a that supports only a first radio access technology, and is within coverage of a second network device such as the RAN node 220b using a second radio access technology that allows only network-assisted mode scheduling of a sidelink operation, the UE 205a establishes a radio resource control connection with the second network device e.g., the RAN node 220b using the second radio access technology. In other words, if the UE is in coverage of a cell from RAT2 but the said cell from RAT2 only allows mode-1 based resource scheduling for PC5 operation, the UE can establish an RRC connection with the said cell from RAT2; or, inform the serving cell e.g., using RRC signaling (as part of V2X interest indication) before establishing an RRC connection with the said cell from RAT2.

In certain embodiments, in response to determining that a remote unit such as the UE 205a is served by a network device such as the RAN node 220a that supports only a first radio access technology (e.g., RAT1) and is within coverage of a second network device such as the RAN node 220b using a second radio access technology (e.g., RAT2) that allows only network-assisted mode scheduling of a V2X sidelink operation, the UE 205a may inform the RAN node 220a via radio resource control signaling prior to establishing a radio resource control connected state with the RAN node 220b using the second radio access technology (e.g., RAT2). Thereafter, the UE 205a may perform an action such as establishing a radio resource control connection with the second network device, i.e., the RAN node 220b using the second radio access technology.

In other embodiments, the UE 205a may communicate in accordance with a vehicle-to-everything response received from the RAN node 220b unless the UE 205a not allowed to leave the radio resource control connected state. In other words, such embodiments the UE 205a is not allowed to leave an RRC connected state then the UE 205a does not perform V2X communication at the moment.

In various embodiments, the UE 205a after having informed the current serving cell such as the RAN node 220a, may go ahead directly with establishing an RRC Connection with the RAN node 220b that supports RAT2; or the UE 205a may wait for a V2X Response from the current serving cell such as the RAN node 220a and act based on the V2X response received.

In certain embodiments, in response to determining that the UE 205a has an interest in using a second radio access technology not supported on the RAN node 220a for a target vehicle-to-everything operation wherein a priority indicator for the target vehicle-to-everything operation is higher than a corresponding priority indicator for a current vehicle-to-everything operation, the UE 205a may release a radio resource control connected state for the RAN node 220a and initiate a transition to a radio resource control idle state for the RAN node 220a. Then, the UE 205a may perform a cell reselection to the RAN node 220b using the second radio access technology and may establish a radio resource control connected state with the second network device to thereby use network-assisted scheduling mode resources of the RAN node 220b.

In other words, if the priority for the V2X message and/or application (or a V2X facilities layer) destined for RAT2 is higher than the priority for the V2X message(s)/application(s) already ongoing on the current serving cell AND if the UE is capable of establishing and maintaining only one RRC connection at any point of time, leave/release RRC Connected state and transition to RRC Idle and perform a cell reselection to the said cell from RAT2, establish RRC connection and use Mode-1 resources of that cell. The priority may be signaled by higher layers and may be the same as or similar to a PPPP or a PPPR in various configurations or may be signaled by a QoS class indicator for V2X communications.

In various embodiments, the release of an RRC Connection may be UE autonomous or with the knowledge of the source serving network wherein the UE 205a informs a source serving network such as RAN node 220a using RRC or NAS signaling about its need to transition to RRC Idle and reselection to RAN node 220b that supports RAT2. In some embodiments, autonomous release of RRC Connection is determined by upper layer/NAS and based on the new V2X preference communicated to the UE AS layer. Upon this the UE AS layer will initiate actions for leaving the RRC Connected state.

In some embodiments, the UE 205a, in response to determining that, as a remote unit, it is served by a network device such as RAN node 220a that supports only a first radio access technology and is within coverage of a second network device that supports a second radio access technology but that does not support vehicle-to-everything sidelink communications, considers the remote unit to be out-of-coverage with respect to the second radio access technology and performs vehicle-to-everything sidelink communications on a preconfigured frequency for out-of-coverage usage. Hence, if the UE is in coverage of a cell from RAT2 but the said cell does not support V2X sidelink communications, the UE shall consider itself to be out of coverage with respect to RAT2 and perform V2X sidelink communications preferably on any preconfigured frequency that may not create interference for the Uu operations on the RAN-2 e.g., choose a preconfigured frequency far away from the Uu frequency. In various embodiments, preconfigured frequencies are part of the pre-configurations configured by upper layers that are to be used when the UE is in out-of-coverage. In further embodiments, if the UE 205a is out of coverage of RAT2, it may perform V2X sidelink communications on any preconfigured frequency. A preconfigured frequency may be part of the pre-configurations configured by upper layers that are to be used when the UE is in out-of-coverage.

Figure 7:
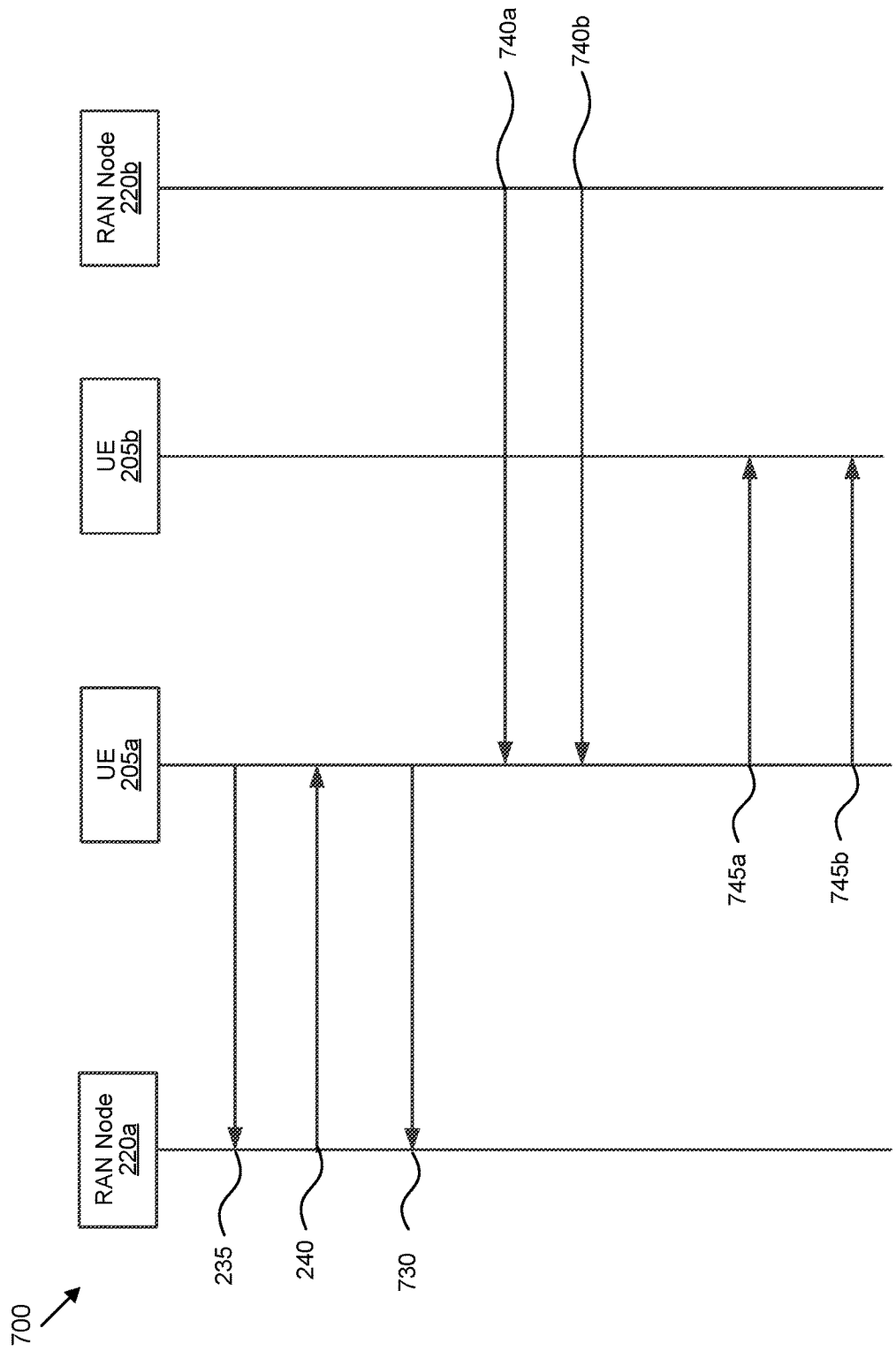
FIG. 7 is a diagram illustrating one embodiment of a network procedure for determining v2x resources based on interest indications for V2X communications on more than one radio access technology involving a serving cell that does not provide V2X resources.

FIG. 7 is a diagram illustrating one embodiment of a network procedure 700 for efficient interworking for V2X communication involving a serving cell that does not provide V2X resources. Thus, the network procedure 700 depicts a Scenario-3 in which a serving cell such does not support V2X communications. In one embodiment, in response to the UE 205a determining that it is in a radio resource control idle state on a radio access network such as RAN node 220a that does not support vehicle-to-everything communications, the UE 205a performs a cell selection and/or cell reselection based on the vehicle-to-everything preference indicated in the remote unit interest indication 235.

In another embodiment, in response to the UE 205a determining that it is in a radio resource control connected state on a radio access network such as RAN node 220a that does not support vehicle-to-everything communications, the UE 205a may reselect a second network device such as RAN node 220b within coverage range that supports vehicle-to-everything communications; and consider the UE 205a to be in an out-of-coverage state thereafter performing the vehicle-to-everything communication such as communications 645a and/or 645b on a vehicle-to-everything sidelink using pre-configured resources.

In various embodiments, in response to determining that the remote unit such as the UE 205a is served by a network device such as the RAN node 220a that supports only a first radio access technology and is within coverage of a second network device such as RAN node 220b that supports a second radio access technology but that does not support vehicle-to-everything sidelink communications, the UE 205a considers the remote unit to be out-of-coverage with respect to the second radio access technology and performs vehicle-to-everything sidelink communications on a preconfigured frequency for out-of-coverage usage.

In certain embodiments, the UE 205a in RRC connected state on a radio network/cell such as RAN node 220a belonging to RAT 1, responds to a V2X response 240 indicating network V2X support type-1 for the RAN node 220a by leaving the RRC Connected state as described earlier and reselect a cell such as the RAN node 220b that supports V2X communications such as communications 745a, 745b. In certain embodiments, the UE 205a may send one or more messages 730 to the RAN node 220a to facilitate accessing the target RAT of interest on a second network device such as RAN node 220b or to facilitate accessing self-managed Mode-2 resources to perform V2X communication 745a, 745b on the target RAT(s) of interest.

With respect to V2X communication on RAT2, for a UE such as the UE 205a in RRC connected state on a radio network or cell such as the RAN node 220a belonging to RAT1, the possibilities mentioned above within Scenario-2 apply to scheduling the V2X communications 745a, 745b on one or both RATs.

In another embodiment, UE in RRC Idle state on radio network/cell belonging to RAT1 shall perform cell selection and reselections based on V2X preference indicate in the remote unit interest indication 235 as determined in upper layers as described earlier.

Figure 8:
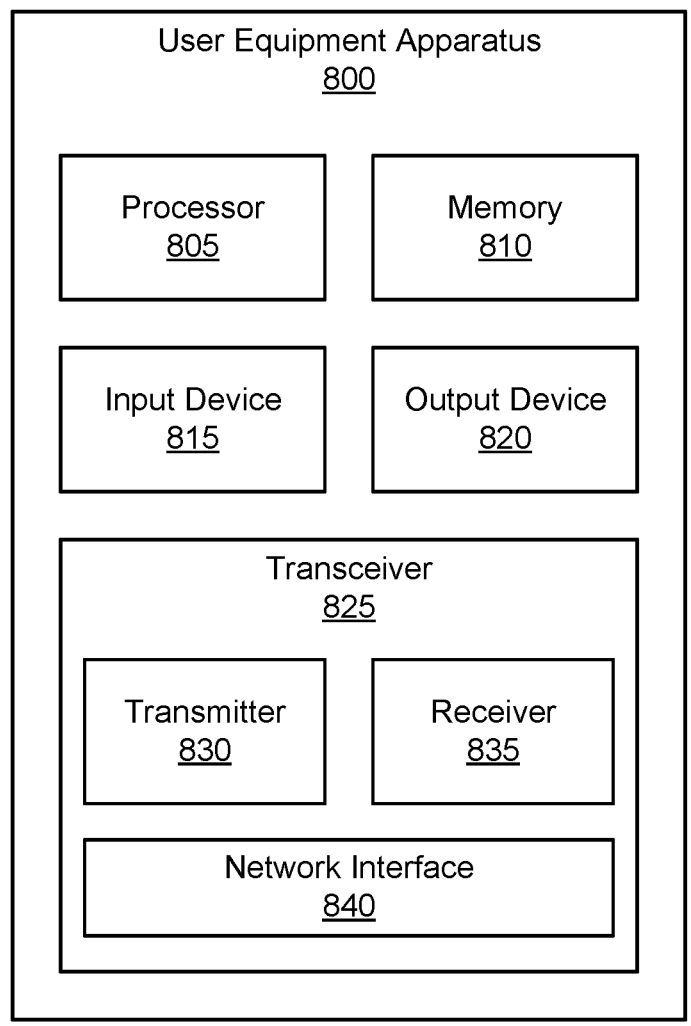
FIG. 8 is a schematic block diagram illustrating one embodiment of an apparatus that may be used for determining v2x resources based on interest indications for V2X communications on more than one radio access technology.

FIG. 8 depicts one embodiment of a user equipment apparatus 800 that may be used for interworking for V2X communication on more than one RAT in accordance with various embodiments of the disclosure. The user equipment apparatus 800 may include one embodiment of the remote unit 105 or UE 205, as described above. Furthermore, the user equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, an FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 detects a change in V2X preference. In one embodiment, detecting the change includes evaluating the V2X preference for currently opened V2X application(s) in response to detecting that at least one V2X application was closed.

Additionally, the processor 805 may update a V2X interest indication based on the V2X preference. Here, the V2X interest indication may be updated in response to the change in V2X preference. Moreover, the V2X interest indication may indicate a target Frequency of interest for V2X reception, a target Frequency of interest for V2X transmission, a target RAT of interest for V2X reception, a target RAT of interest for V2X transmission, a target scheduling mode of interest for V2X transmission, and/or Some other information as indicated in individual scenarios. Moreover, the processor 805 may control the transceiver 825 to send the updated V2X interest indication to the RAN.

The memory 810, in one embodiment, is a computer readable storage medium. In some embodiments, the memory 810 includes volatile computer storage media. For example, the memory 810 may include a RAM, including DRAM, SDRAM, and/or SRAM. In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to modifying a radio capability. For example, the memory 810 may store UE radio capabilities, CM states, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, such as for example, a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smartwatch, smart glasses, a heads-up display, or the like. Further, the output device 820 may be a component of a smartphone, a personal digital assistant, a television, a tablet computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to send messages to a AAA server or NF, as described herein. Similarly, one or more receivers 835 may be used to receive messages to a AAA server or NF, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over an unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, a network interface 840.

In various embodiments, one or more transmitters 830 and/or one or more receivers 835 may be implemented and/or integrated into a single hardware component, such as a multi-transceiver chip, a system-on-a-chip, an ASIC, or other types of hardware components. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
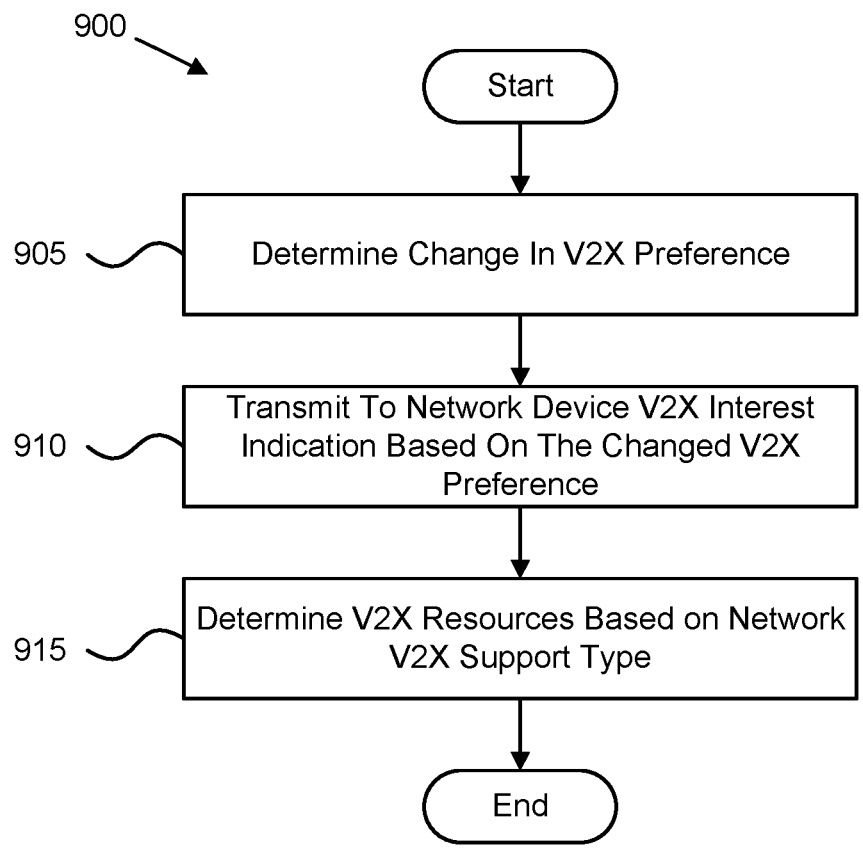
FIG. 9 is a block diagram illustrating one embodiment of a method for determining v2x resources based on interest indications for V2X communications on more than one radio access technology.

FIG. 9 depicts one embodiment of a method 900 for efficient V2X interworking, according to embodiments of the disclosure. In various embodiments, the method 900 is performed by the remote unit 105, the UE 205, and/or the user equipment apparatus 800, described above. In some embodiments, the method 900 is performed by a processor, such as a microcontroller, a microprocessor, a CPU, a GPU, an auxiliary processing unit, an FPGA, or the like.

The method 900 begins and detects 905 a change in V2X preference. In one embodiment, detecting 905 the change includes evaluating the V2X preference for currently opened V2X application(s) in response to detecting that at least one V2X application was closed.

The method 900 includes updating 910 a V2X interest indication based on the V2X preference. Here, the V2X interest indication may be updated in response to the change in V2X preference. Moreover, the V2X interest indication may indicate a target Frequency of interest for V2X reception, a target Frequency of interest for V2X transmission, a target RAT of interest for V2X reception, a target RAT of interest for V2X transmission, a target scheduling mode of interest for V2X transmission, and/or some other information as indicated in various individual scenarios.

The method 900 includes communicating 915 the updated V2X interest indication to the RAN. The method 900 ends. In various embodiments, the user equipment interest indication procedure 200, the UE 205, and/or the wireless communication system 100 may perform at least a portion of one or more of the steps of the method 900.

An apparatus for determining V2X resources based on interest indications V2X communications on more than one radio access technology includes, in one embodiment, a processor that determines a change in a vehicle-to-everything preference for a vehicle-to-everything application for a remote unit and a transceiver that transmits to a network device a remote unit interest indication in response to the processor determining the change in the vehicle-to-everything preference, where the processor further determines vehicle-to-everything resources for the remote unit based on a network vehicle-to-everything support type for the network device selected from a plurality of network vehicle-to-everything support types including at least one network vehicle-to-everything support type that supports simultaneous communications on more than one radio access technology.

In some embodiments, the remote unit interest indication includes at least one target vehicle-to-everything parameter of interest selected from: a target radio access technology of interest for vehicle-to-everything reception; a target radio access technology of interest for vehicle-to-everything transmission; a target scheduling mode of interest for vehicle-to-everything transmission; and combinations thereof. In various embodiments, the processor, in response to determining that the remote unit is in a radio resource control connected state, selects the vehicle-to-everything preference for the vehicle-to-everything application responsive to determining that the vehicle-to-everything application has a priority indicator with a higher priority than a non-vehicle-to-everything application.

The processor, in certain embodiments, in response to determining that simultaneous current and target vehicle-to-everything communications are not allowed based on at least one of a vehicle-to-everything capability of the remote unit and the network vehicle-to-everything support type, selects the vehicle-to-everything preference for the vehicle-to-everything application responsive to determining that a priority indicator of the vehicle-to-everything application is higher than corresponding priority indicators of at least one competing vehicle-to-everything application.

In some embodiments, the remote unit interest indication includes a target scheduling mode selected from: a network-assisted scheduling mode where the network device sends a grant for the remote unit to transmit vehicle-to-everything messages; and a self-managed scheduling mode where the remote unit selects resources for transmitting vehicle-to-everything messages from a resource pool broadcasted by the network device, a resource pool for the remote unit when it is out of network coverage, and combinations thereof.

In various embodiments, the network vehicle-to-everything support type for the network device is selected from: a first support type that provides no resources for vehicle-to-everything communication; a second support type that provides vehicle-to-everything resources for a single radio access technology; and a third support type that provides vehicle-to-everything resources for more than one radio access technology. In some embodiments, the processor determines the network vehicle-to-everything support type for each radio access technology supported by the network device as communicated directly in a communication selected from a broadcast message, dedicated radio resource control signaling, a non-access stratum message, and combinations thereof.

The network vehicle-to-everything support type for the network device is implicitly indicated, in certain embodiments, to the remote unit by one of: scheduling information communicated to the remote unit for a system information block, irrespective of whether a corresponding system information block is being transmitted; and successful acquisition of a corresponding system information block. In various embodiments, the processor further performs dynamic scheduling of network-assisted mode resources for the vehicle-to-everything application on a first radio access technology sidelink and on a second radio access technology sidelink, using network-assisted mode resources of the first radio access technology sidelink and the second radio access technology sidelink indicated in control link information received from the network device, the control link information selected from downlink control information, broadcast information, and combinations thereof.

In some embodiments, the control link information is scrambled with: a first radio network temporary identifier in response to determining that the vehicle-to-everything application includes a basic safety message application; and a second radio network temporary identifier in response to determining that the vehicle-to-everything application includes an advanced vehicle-to-everything application. In various embodiments, the control link information directly indicates for which of the first radio access technology sidelink and the second radio access technology sidelink a grant is being provided.

In certain embodiments, the remote unit interest indication includes at least one target radio access technology of interest, and self-managed mode resource pool information to use for vehicle-to-everything communications on the at least one target radio access technology of interest, where the processor receives a self-managed mode resource grant from the network device based on the self-managed mode resource pool information. In some embodiments, the remote unit interest indication further includes one or more vehicle-to-everything identification interests selected from application identifications, quality of service identifications, source identifications, and combinations thereof. In certain embodiments, the remote unit interest indication further includes one or more vehicle-to-everything message type interests selected from cooperative awareness messages, decentralized environmental notification messages, basic safety messages, and combinations thereof. In various embodiments, the remote unit interest indication further includes at least one vehicle-to-everything scenario selected from vehicle platooning, advanced driving, extended sensors, remote driving, and combinations thereof.

In some embodiments, in response to the network device determining that the change in the vehicle-to-everything preference for the vehicle-to-everything application is to communicate a vehicle-to-everything message on a radio access technology that is not supported on the network device, the processor receives a vehicle-to-everything response including a handover command toward one or more of: a target frequency interest indicated in the remote unit interest indication; and a target radio access technology indicated in the remote unit interest indication.

The processor, in certain embodiments, in response to determining that the remote unit is served by the network device that supports only a first radio access technology, and is within coverage of a second network device using a second radio access technology belonging to an allowed public land mobile network and that cell selection criteria based on reference signal received power for the remote unit are satisfied for the second network device, uses self-managed scheduling mode resources from a broadcast resource pool from the second network device for vehicle-to-everything sidelink communications.

In various embodiments, the processor, in response to determining that the remote unit is served by the network device that supports only a first radio access technology, and is within coverage of a second network device using a second radio access technology that allows only network-assisted mode scheduling of a sidelink operation, causes the remote unit to establish a radio resource control connection with the second network device using the second radio access technology.

In some embodiments, the processor, in response to determining that the remote unit is served by the network device that supports only a first radio access technology and is within coverage of a second network device using a second radio access technology that allows only network-assisted mode scheduling of a sidelink operation: informs the network device via radio resource control signaling prior to establishing a radio resource control connected state with the second network device using the second radio access technology; and performs an action selected from: establishing a radio resource control connection with the second network device using the second radio access technology; and communicating in accordance with a vehicle-to-everything response received from the second network device unless the remote unit is not allowed to leave the radio resource control connected state.

In certain embodiments, the processor, in response to determining that the remote unit has an interest in using a second radio access technology not supported on the network device for a target vehicle-to-everything operation where a priority indicator for the target vehicle-to-everything operation is higher than a corresponding priority indicator for a current vehicle-to-everything operation: releases a radio resource control connected state for the network device; initiates a transition to a radio resource control idle state for the network device; performs a cell reselection to a second network device using the second radio access technology; establishes a radio resource control connected state with the second network device; and uses network-assisted scheduling mode resources of the second network device.

In various embodiments, the processor, in response to determining that the remote unit is served by the network device that supports only a first radio access technology and is within coverage of a second network device that supports a second radio access technology but that does not support vehicle-to-everything sidelink communications, the processor: considers the remote unit to be out-of-coverage with respect to the second radio access technology; and cause the remote unit to perform vehicle-to-everything sidelink communications a preconfigured frequency for out-of-coverage usage by the remote unit. In some embodiments, the preconfigured frequency is selected to be non-interfering with the vehicle-to-network frequency.

In some embodiments, the processor, in response to determining that the remote unit is in a radio resource control connected state on a radio access network that does not support vehicle-to-everything communications, performs at least one of: causing the remote unit to reselect a second network device within coverage range that supports vehicle-to-everything communications; and considering the remote unit to be in an out-of-coverage state and causing the remote unit to perform the vehicle-to-everything communication on a vehicle-to-everything sidelink using pre-configured resources.

In certain embodiments, the processor in response to determining that the remote unit is in a radio resource control idle state on a radio access network that does not support vehicle-to-everything communications, causes the remote unit to perform at least one cell selection, cell reselection, or combinations thereof based on the vehicle-to-everything preference indicated in the remote unit interest indication. In various embodiments, the processor determines the change in the vehicle-to-everything preference for the vehicle-to-everything application on at least one upper layer of the remote unit relative to an access stratum of the remote unit. In some embodiments, the processor communicates the vehicle-to-everything preference to an access stratum of the remote unit.

The transceiver, in certain embodiments, receives a vehicle-to-everything response from the network device in response to transmitting the remote unit interest indication.

In various embodiments, the processor further determines a vehicle-to-everything capability of the remote unit. In some embodiments, the vehicle-to-everything capability of the remote unit includes support for the vehicle-to-everything application and support for at least one non-vehicle-to-everything applications.

In some embodiments, the processor determines the vehicle-to-everything capability of the remote unit based on at least one of subscription information for the remote unit and vehicle-to-everything capabilities of the vehicle-to-everything application currently running. In various embodiments, the processor further determines a state for the remote unit, the state selected from a radio resource control idle state, a radio resource control connected state, a radio resource control inactive state, and an out-of-coverage state. In some embodiments, the processor detects the change in the vehicle-to-everything preference by evaluating the vehicle-to-everything preference for currently open vehicle-to-everything applications in response to detecting that at least one vehicle-to-everything application is closed. In certain embodiments, the processor releases a radio resource control connected state for the first network device as determined by a non-access stratum of the remote unit based on the change in vehicle-to-everything-preference communicated to the access stratum of the remote unit.

A method for efficient interworking for V2X communications on more than one radio access technology includes, in one embodiment: determining a change in a vehicle-to-everything preference for a vehicle-to-everything application for a remote unit; transmitting to a network device, a remote unit interest indication in response to determining the change in the vehicle-to-everything preference; and determining vehicle-to-everything resources for the remote unit based on a network vehicle-to-everything support type for the network device selected from a plurality of network vehicle-to-everything support types including at least one network vehicle-to-everything support type that supports simultaneous communications on more than one radio access technology.

In various embodiments, the remote unit interest indication includes at least one target vehicle-to-everything parameter of interest selected from: a target radio access technology of interest for vehicle-to-everything reception; a target radio access technology of interest for vehicle-to-everything transmission; a target scheduling mode of interest for vehicle-to-everything transmission; and combinations thereof.

In at least one embodiment, the method includes, in response to determining that the remote unit is in a radio resource control connected state, selecting the vehicle-to-everything preference for the vehicle-to-everything application responsive to determining that the vehicle-to-everything application has a priority indicator with a higher priority than a non-vehicle-to-everything application.

In some embodiments, the method further includes in response to determining that simultaneous current and target vehicle-to-everything communications are not allowed based on at least one of a vehicle-to-everything capability of the remote unit and the network vehicle-to-everything support type, selecting the vehicle-to-everything preference for the vehicle-to-everything application responsive to determining that a priority indicator of the vehicle-to-everything application is higher than corresponding priority indicators of at least one competing vehicle-to-everything application.

The remote unit interest indication, in various embodiments, includes a target scheduling mode selected from: a network-assisted scheduling mode where the network device sends a grant for the remote unit to transmit vehicle-to-everything messages; and a self-managed scheduling mode where the remote unit selects resources for transmitting vehicle-to-everything messages from a resource pool broadcasted by the network device, a resource pool for the remote unit when it is out of network coverage, and combinations thereof. In at least one embodiment, where the network vehicle-to-everything support type for the network device is selected from: a first support type that provides no resources for vehicle-to-everything communication; a second support type that provides vehicle-to-everything resources for a single radio access technology; and a third support type that provides vehicle-to-everything resources for more than one radio access technology.

In certain embodiments, the method includes determining the network vehicle-to-everything support type for each radio access technology supported by the network device as communicated directly in a communication selected from a broadcast message, dedicated radio resource control signaling, a non-access stratum message, and combinations thereof. In at least one embodiment, where the network vehicle-to-everything support type for the network device is implicitly indicated to the remote unit by one of: scheduling information communicated to the remote unit for a system information block, irrespective of whether a corresponding system information block is being transmitted; and successful acquisition of a corresponding system information block.

In various embodiments, the method includes performing dynamic scheduling of network-assisted mode resources for the vehicle-to-everything application on a first radio access technology sidelink and on a second radio access technology sidelink, using network-assisted mode resources of the first radio access technology sidelink and the second radio access technology sidelink indicated in control link information received from the network device and selected from downlink control information, broadcast information, and combinations thereof. In some embodiments, the control link information is scrambled with: a first radio network temporary identifier in response to determining that the vehicle-to-everything application includes a basic safety message application; and a second radio network temporary identifier in response to determining that the vehicle-to-everything application includes an advanced vehicle-to-everything application. In at least one embodiment, the control link information directly indicates for which of the first radio access technology sidelink and the second radio access technology sidelink a grant is being provided.

In certain embodiments, the method includes: receiving a self-managed mode resource grant from the network device based on the self-managed mode resource pool information, where the remote unit interest indication includes at least one of: a target radio access technology of interest; and a self-managed mode resource pool information to use for vehicle-to-everything communications on the at least one target radio access technology of interest.

In various embodiments, the remote unit interest indication further includes one or more vehicle-to-everything identification interests selected from application identifications, quality of service identifications, source identifications, and combinations thereof.

In at least one embodiment, the remote unit interest indication further includes one or more vehicle-to-everything message type interests selected from cooperative awareness messages, decentralized environmental notification messages, basic safety messages, and combinations thereof.

In some embodiments, the remote unit interest indication further includes at least one vehicle-to-everything scenario selected from vehicle platooning, advanced driving, extended sensors, remote driving, and combinations thereof.

In various embodiments, the method further includes in response to the network device determining that the change in the vehicle-to-everything preference for the vehicle-to-everything application is to communicate a vehicle-to-everything message on a radio access technology that is not supported on the network device, receiving a vehicle-to-everything response including a handover command toward one or more of: a target frequency interest indicated in the remote unit interest indication; and a target radio access technology indicated in the remote unit interest indication.

In at least one embodiment, the method further includes in response to determining that the remote unit is served by the network device that support only a first radio access technology, and is within coverage of a second network device using a second radio access technology belonging to an allowed public land mobile network and that cell selection criteria based on reference signal received power for the remote unit are satisfied for the second network device, using self-managed scheduling mode resources from a broadcast resource pool from the second network device for vehicle-to-everything sidelink communications.

In some embodiments, the method further includes in response to determining that the remote unit is served by the network device that supports only a first radio access technology, and is within coverage of a second network device using a second radio access technology that allows only network-assisted mode scheduling of a sidelink operation, establishing a radio resource control connection with the second network device using the second radio access technology.

In various embodiments, the method further includes in response to determining that the remote unit is served by the network device that supports only a first radio access technology and is within coverage of a second network device using a second radio access technology that allows only network-assisted mode scheduling of a sidelink operation: informing the network device via radio resource control signaling prior to establishing a radio resource control connected state with the second network device using the second radio access technology; and performing an action selected from: establishing a radio resource control connection with the second network device using the second radio access technology; and communicating in accordance with a vehicle-to-everything response received from the second network device unless the remote unit is not allowed to leave the radio resource control connected state.

In at least one embodiment, the method further includes in response to determining that the remote unit has an interest in using a second radio access technology not supported on the network device for a target vehicle-to-everything operation where a priority indicator for the target vehicle-to-everything operation is higher than a corresponding priority indicator for a current vehicle-to-everything operation: releasing a radio resource control connected state for the network device; initiating a transition to a radio resource control idle state for the network device; performing a cell reselection to a second network device using the second radio access technology; establishing a radio resource control connected state with the second network device; and using network-assisted scheduling mode resources of the second network device.

In certain embodiments, the method further includes in response to determining that the remote unit is served by the network device that supports only a first radio access technology and is within coverage of a second network device that supports a second radio access technology but that does not support vehicle-to-everything sidelink communications: considering the remote unit to be out-of-coverage with respect to the second radio access technology; and causing the remote unit to perform vehicle-to-everything sidelink communications on a preconfigured frequency for out-of-coverage usage by the remote unit.

In various embodiments, the method includes, in response to determining that the remote unit is in a radio resource control connected state on a radio access network that does not support vehicle-to-everything communications, performing at least one of: reselecting a second network device within coverage range that supports vehicle-to-everything communications; and considering the remote unit to be in an out-of-coverage state and performing the vehicle-to-everything communication on a vehicle-to-everything sidelink using pre-configured resources.

In at least one embodiment, the method includes, in response to determining that the remote unit is in a radio resource control idle state on a radio access network that does not support vehicle-to-everything communications, performing at least one cell selection, cell reselection, or combinations thereof, based on the vehicle-to-everything preference indicated in the remote unit interest indication. In some embodiments, the method includes determining the change in the vehicle-to-everything preference for the vehicle-to-everything application on at least one upper layer of the remote unit relative to an access stratum of the remote unit. In certain embodiments, the method includes communicating the vehicle-to-everything preference to an access stratum of the remote unit.

In various embodiments, the method includes receiving a vehicle-to-everything response from the network device in response to transmitting the remote unit interest indication. In at least one embodiment, the method includes determining a vehicle-to-everything capability of the remote unit. In some embodiments, the vehicle-to-everything capability of the remote unit includes support for the vehicle-to-everything application and support for at least one non-vehicle-to-everything applications. In certain embodiments, the method includes determining the vehicle-to-everything capability of the remote unit based on at least one of subscription information for the remote unit and vehicle-to-everything capabilities of the vehicle-to-everything application currently running.

In at least one embodiment, the method includes determining a state for the remote unit, the state selected from a radio resource control idle state, a radio resource control connected state, a radio resource control inactive state, and an out-of-coverage state. In some embodiments, the method includes determining the change in the vehicle-to-everything preference by evaluating the vehicle-to-everything preference for currently open vehicle-to-everything applications in response to detecting that at least one vehicle-to-everything application is closed. In various embodiments, the method includes releasing a radio resource control connected state for the first network device as determined by a non-access stratum of the remote unit based on the change in vehicle-to-everything-preference communicated to the access stratum of the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor that determines a change in a vehicle-to-everything preference for a vehicle-to-everything application for a remote unit; and
   a transceiver that transmits to a network device a remote unit interest indication in response to the processor determining the change in the vehicle-to-everything preference, wherein:
      the processor further determines vehicle-to-everything resources for the remote unit based on a network vehicle-to-everything support type for the network device selected from a plurality of network vehicle-to-everything support types comprising at least one network vehicle-to-everything support type that supports simultaneous communications on more than one radio access technology; and
      in response to the network device determining that the change in the vehicle-to-everything preference for the vehicle-to-everything application is to communicate a vehicle-to-everything message on a radio access technology that is not supported on the network device, the processor receives a vehicle-to-everything response comprising a handover command toward one or more of:
         a target frequency interest indicated in the remote unit interest indication; and
         a target radio access technology indicated in the remote unit interest indication.

2. The apparatus of claim 1, wherein the remote unit interest indication comprises at least one target vehicle-to-everything parameter of interest selected from:
   a target radio access technology of interest for vehicle-to-everything reception;
   a target radio access technology of interest for vehicle-to-everything transmission;
   a target scheduling mode of interest for vehicle-to-everything transmission; and
   combinations thereof.

3. The apparatus of claim 1, wherein the processor, in response to determining that the remote unit is in a radio resource control connected state, selects the vehicle-to-everything preference for the vehicle-to-everything application responsive to determining that the vehicle-to-everything application has a priority indicator with a higher priority than a non-vehicle-to-everything application.

4. The apparatus of claim 1, wherein the processor, in response to determining that simultaneous current and target vehicle-to-everything communications are not allowed based on at least one of a vehicle-to-everything capability of the remote unit and the network vehicle-to-everything support type, selects the vehicle-to-everything preference for the vehicle-to-everything application responsive to determining that a priority indicator of the vehicle-to-everything application is higher than corresponding priority indicators of at least one competing vehicle-to-everything application.

5. The apparatus of claim 1, wherein the remote unit interest indication comprises a target scheduling mode selected from:
   a network-assisted scheduling mode wherein the network device sends a grant for the remote unit to transmit vehicle-to-everything messages; and
   a self-managed scheduling mode wherein the remote unit selects resources for transmitting vehicle-to-everything messages from a resource pool broadcasted by the network device, a resource pool for the remote unit when it is out of network coverage, and combinations thereof.

6. The apparatus of claim 1, wherein the network vehicle-to-everything support type for the network device is selected from:
   a first support type that provides no resources for vehicle-to-everything communication;
   a second support type that provides vehicle-to-everything resources for a single radio access technology; and
   a third support type that provides vehicle-to-everything resources for more than one radio access technology.

7. The apparatus of claim 1, wherein the processor determines the network vehicle-to-everything support type for each radio access technology supported by the network device as communicated directly in a communication selected from a broadcast message, dedicated radio resource control signaling, a non-access stratum message, and combinations thereof.

8. The apparatus of claim 1, wherein the network vehicle-to-everything support type for the network device is implicitly indicated to the remote unit by one of:
   scheduling information communicated to the remote unit for a system information block, irrespective of whether a corresponding system information block is being transmitted; and
   successful acquisition of a corresponding system information block.

9. The apparatus of claim 1, wherein the processor further performs dynamic scheduling of network-assisted mode resources for the vehicle-to-everything application on a first radio access technology sidelink and on a second radio access technology sidelink, using network-assisted mode resources of the first radio access technology sidelink and the second radio access technology sidelink indicated in control link information received from the network device and selected from downlink control information, broadcast information, and combinations thereof.

10. The apparatus of claim 9, wherein the control link information is scrambled with:
    a first radio network temporary identifier in response to determining that the vehicle-to-everything application comprises a basic safety message application; and
    a second radio network temporary identifier in response to determining that the vehicle-to-everything application comprises an advanced vehicle-to-everything application.

11. The apparatus of claim 9, wherein the control link information directly indicates for which of the first radio access technology sidelink and the second radio access technology sidelink a grant is being provided.

12. The apparatus of claim 1, wherein:
    the remote unit interest indication comprises at least one target radio access technology of interest, and self-managed mode resource pool information to use for vehicle-to-everything communications on the at least one target radio access technology of interest; and
    wherein the processor receives a self-managed mode resource grant from the network device based on the self-managed mode resource pool information.

13. The apparatus of claim 1, wherein the remote unit interest indication further comprises one or more vehicle-to-everything identification interests selected from application identifications, quality of service identifications, source identifications, and combinations thereof.

14. The apparatus of claim 1, wherein the remote unit interest indication further comprises one or more vehicleto-everything message type interests selected from cooperative awareness messages, decentralized environmental notification messages, basic safety messages, and combinations thereof.

15. The apparatus of claim 1, wherein the remote unit interest indication further comprises at least one vehicle-to-everything scenario selected from vehicle platooning, advanced driving, extended sensors, remote driving, and combinations thereof.

16. The apparatus of claim 1, wherein the processor, in response to determining that the remote unit is served by the network device that supports only a first radio access technology, and is within coverage of a second network device using a second radio access technology belonging to an allowed public land mobile network and that cell selection criteria based on reference signal received power for the remote unit are satisfied for the second network device, uses self-managed scheduling mode resources from a broadcast resource pool from the second network device for vehicle-to-everything sidelink communications.

17. The apparatus of claim 1, wherein the processor, in response to determining that the remote unit is served by the network device that supports only a first radio access technology, and is within coverage of a second network device using a second radio access technology that allows only network-assisted mode scheduling of a sidelink operation, causes the remote unit to establish a radio resource control connection with the second network device using the second radio access technology.

18. The apparatus of claim 1, wherein the processor, in response to determining that the remote unit is served by the network device that supports only a first radio access technology and is within coverage of a second network device using a second radio access technology that allows only network-assisted mode scheduling of a sidelink operation:
informs the network device via radio resource control signaling prior to establishing a radio resource control connected state with the second network device using the second radio access technology; and
performs an action selected from:
establishing a radio resource control connection with the second network device using the second radio access technology; and
communicating in accordance with a vehicle-to-everything response received from the second network device unless the remote unit is not allowed to leave the radio resource control connected state.

19. The apparatus of claim 1, wherein the processor, in response to determining that the remote unit has an interest in using a second radio access technology not supported on the network device for a target vehicle-to-everything operation wherein a priority indicator for the target vehicle-to-everything operation is higher than a corresponding priority indicator for a current vehicle-to-everything operation:
releases a radio resource control connected state for the network device;
initiates a transition to a radio resource control idle state for the network device;
performs a cell reselection to a second network device using the second radio access technology;
establishes a radio resource control connected state with the second network device; and
uses network-assisted scheduling mode resources of the second network device.

20. The apparatus of claim 1, wherein the processor, in response to determining that the remote unit is served by the network device that supports only a first radio access technology and is within coverage of a second network device that supports a second radio access technology but that does not support vehicle-to-everything sidelink communications, the processor:
considers the remote unit to be out-of-coverage with respect to the second radio access technology; and
cause the remote unit to perform vehicle to everything sidelink communications a preconfigured frequency for out-of-coverage usage by the remote unit.

21. An apparatus comprising:
a processor that determines a change in a vehicle-to-everything preference for a vehicle-to-everything application for a remote unit; and
a transceiver that transmits to a network device a remote unit interest indication in response to the processor determining the change in the vehicle-to-everything preference, wherein the processor:
determines vehicle-to-everything resources for the remote unit based at least in part on whether the network device includes a network vehicle-to-everything support type for the network device, the network vehicle-to-everything support type if present being selected from a plurality of network vehicle-to-everything support types comprising at least one network vehicle-to-everything support type that supports simultaneous communications on more than one radio access technology; and
in response to determining that the remote unit is in a radio resource control connected state on a radio access network that does not support vehicle-to-everything communications, performs at least one of:
causing the remote unit to reselect a second network device within coverage range that supports vehicle-to-everything communications; and
considering the remote unit to be in an out-of-coverage state and causing the remote unit to perform the vehicle-to-everything communication on a vehicle-to-everything sidelink using pre-configured resources.

22. The apparatus of claim 21, wherein the processor in response to determining that the remote unit is in a radio resource control idle state on a radio access network that does not support vehicle-to-everything communications, causes the remote unit to perform at least one of cell selection, cell reselection, or combinations thereof, based on the vehicle-to-everything preference indicated in a remote unit interest indication.

23. A method comprising:
determining a change in a vehicle-to-everything preference for a vehicle-to-everything application for a remote unit;
transmitting to a network device, a remote unit interest indication in response to determining the change in the vehicle-to-everything preference;
determining whether the network device supports vehicle-to-everything communications;
wherein, in response to determining that the network device supports vehicle-to-everything communications, further performing:
determining vehicle-to-everything resources for the remote unit based on a network vehicle-to-everything support type for the network device selected from a plurality of network vehicle-to-everything support types comprising at least one network vehicle-to-everything support type that supports simultaneous communications on more than one radio access technology;

receiving a vehicle-to-everything response comprising a handover command in response to the network device determining that the change in the vehicle-to-everything preference for the vehicle-to-everything application is to communicate a vehicle-to-everything message on a radio access technology that is not supported on the network device, wherein the handover command comprises one or more of:
   a target frequency interest indicated in the remote unit interest indication; and
   a target radio access technology indicated in the remote unit interest indication.

24. The method of claim 23, further comprising, in response to determining that the network device does not support vehicle-to-everything communications:
determining vehicle-to-everything resources for the remote unit based at least in part on whether the network device includes a network vehicle-to-everything support type for the network device, the network vehicle-to-everything support type if present being selected from a plurality of network vehicle-to-everything support types comprising at least one network vehicle-to-everything support type that supports simultaneous communications on more than one radio access technology; and in response to determining that the remote unit is in a radio resource control connected state on a radio access network that does not support vehicle-to-everything communications, performing at least one of:
   causing the remote unit to reselect a second network device within coverage range that supports vehicle-to-everything communications; and
   considering the remote unit to be in an out-of-coverage state and causing the remote unit to perform vehicle-to-everything communication on a vehicle-to-everything sidelink using pre-configured resources.

* * * * *